(12) United States Patent
Tokuchi

(10) Patent No.: US 11,900,278 B2
(45) Date of Patent: Feb. 13, 2024

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 228 days.

(21) Appl. No.: 17/329,698

(22) Filed: May 25, 2021

(65) Prior Publication Data

US 2022/0147883 A1 May 12, 2022

(30) Foreign Application Priority Data

Nov. 11, 2020 (JP) ................................ 2020-188208

(51) Int. Cl.
*G06Q 10/02* (2012.01)
*G06Q 10/109* (2023.01)
*G07C 9/00* (2020.01)
*G07F 17/00* (2006.01)

(52) U.S. Cl.
CPC ........... *G06Q 10/02* (2013.01); *G06Q 10/109* (2013.01); *G07C 9/00904* (2013.01); *G07F 17/0014* (2013.01)

(58) Field of Classification Search
CPC .. G06Q 10/02; G06Q 10/109; G07C 9/00904; G07F 17/0014
USPC ............................................................ 705/5
See application file for complete search history.

(56) References Cited

U.S. PATENT DOCUMENTS

| 10,713,873 | B1* | 7/2020 | Winegar ............... H04W 12/61 |
| 11,100,465 | B1* | 8/2021 | Burge ........................ G05F 1/66 |
| 11,429,927 | B1* | 8/2022 | Melancon ............ G06Q 10/087 |
| 11,507,891 | B2* | 11/2022 | Clark ...................... G06Q 10/02 |
| 11,658,497 | B1* | 5/2023 | Townsend, III ...... G06V 40/172 320/107 |
| 2015/0170448 | A1* | 6/2015 | Robfogel ................. G07C 9/20 340/5.61 |
| 2015/0348049 | A1* | 12/2015 | Todasco ................ G06Q 50/12 705/14.1 |
| 2016/0267402 | A1* | 9/2016 | Szabo ..................... G06Q 10/02 |
| 2016/0321565 | A1* | 11/2016 | Mendoza ............... G06Q 50/12 |
| 2017/0061442 | A1* | 3/2017 | Barlow .................. H04W 4/021 |
| 2017/0213161 | A1* | 7/2017 | Moati .................... G06Q 10/02 |
| 2020/0034872 | A1* | 1/2020 | Chapoutot ........... G06Q 10/025 |
| 2020/0111033 | A1* | 4/2020 | Mahajan .............. G06Q 10/087 |

(Continued)

FOREIGN PATENT DOCUMENTS

| JP | 2003-233740 A | 8/2003 |
| JP | 2010-196256 A | 9/2010 |
| WO | WO-2018067369 A1 * | 4/2018 ......... G06Q 10/0633 |

OTHER PUBLICATIONS

Online Hotel Reservation Published by International Journal of Innovative Science Engineering and Technology (Year: 2014).*

*Primary Examiner* — Zeina Elchanti
(74) *Attorney, Agent, or Firm* — Oliff PLC

(57) ABSTRACT

An information processing apparatus includes a processor configured to provide a notification about reservation information related to a reservation of a reserved private room in a case where an entry to the private room is not confirmable before a predetermined time from a usage start time point according to the reservation of the private room.

19 Claims, 30 Drawing Sheets

(56) References Cited

U.S. PATENT DOCUMENTS

| | | | |
|---|---|---|---|
| 2020/0118074 A1* | 4/2020 | Natarajan | G06Q 10/087 |
| 2020/0160243 A1* | 5/2020 | Tomosugi | G06Q 10/06311 |
| 2021/0192396 A1* | 6/2021 | Morita | G06F 1/14 |
| 2022/0019472 A1* | 1/2022 | Norota | G06Q 10/109 |
| 2022/0172135 A1* | 6/2022 | Bidner | G06Q 30/016 |
| 2022/0398528 A1* | 12/2022 | Gupta | G06Q 50/28 |
| 2022/0405775 A1* | 12/2022 | Siebel | G06Q 30/0202 |
| 2022/0414804 A1* | 12/2022 | Cha | G06F 9/44 |

\* cited by examiner

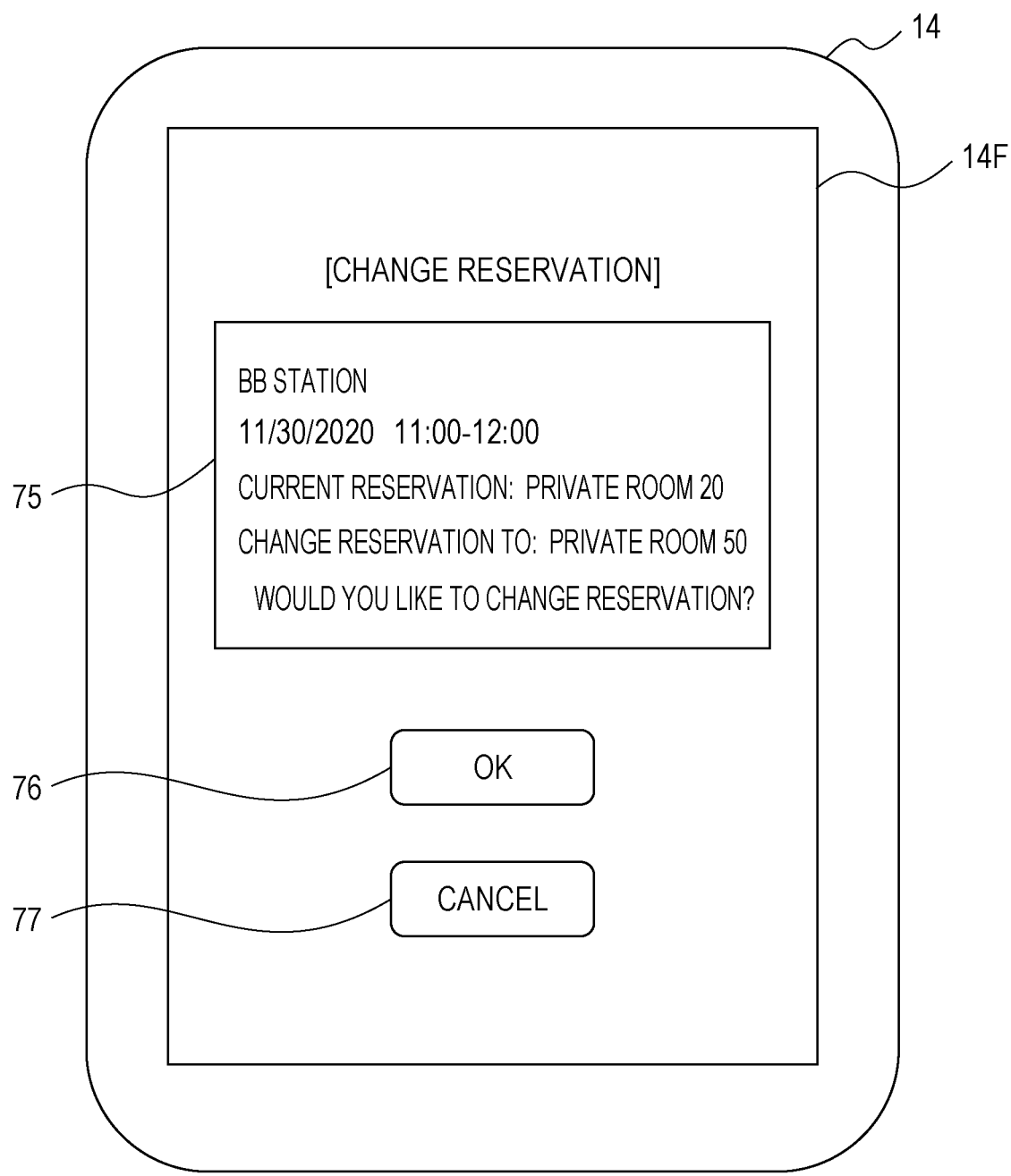

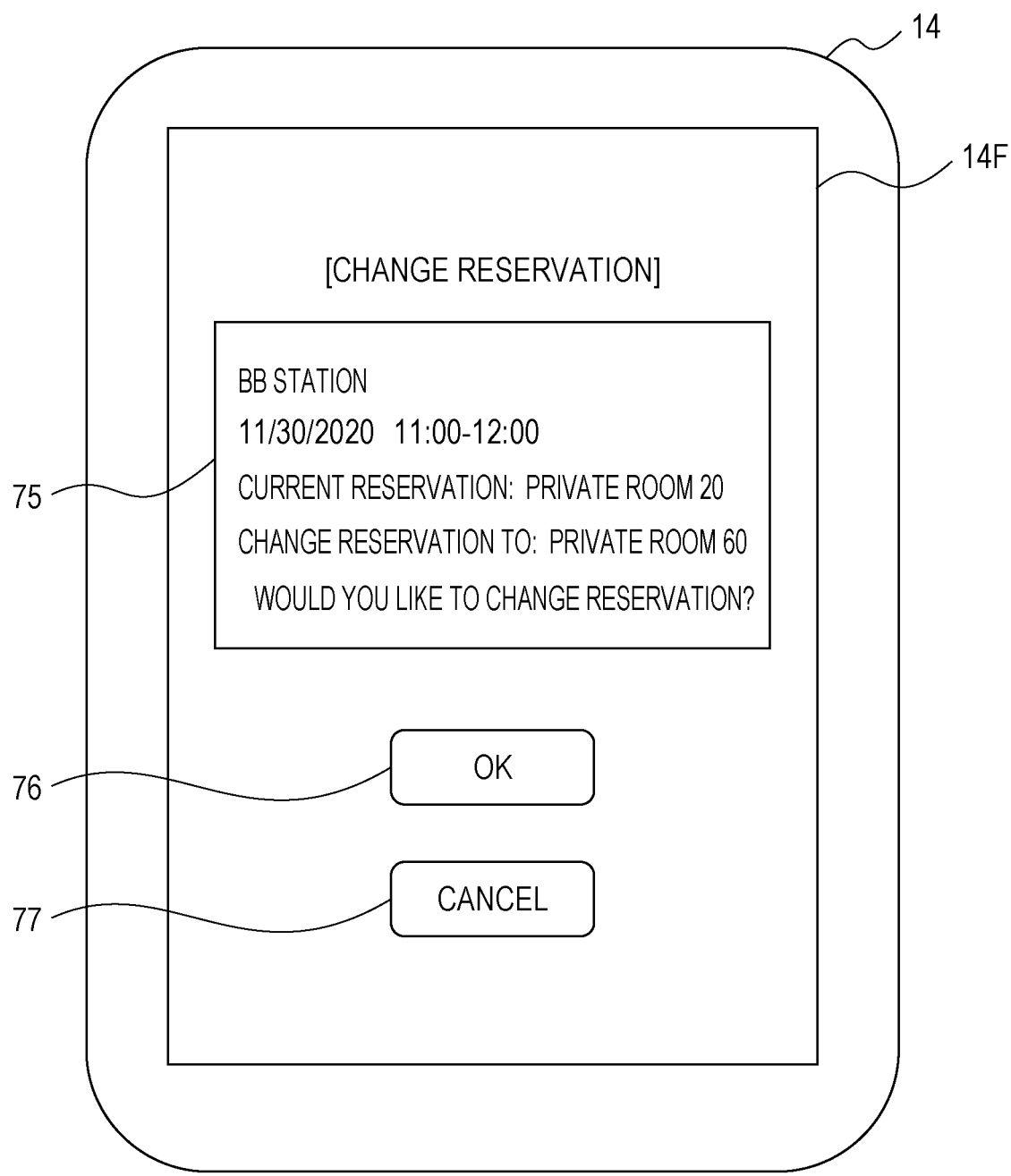

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-188208 filed Nov. 11, 2020.

BACKGROUND

(i) Technical Field

The present disclosure relates to information processing apparatuses and non-transitory computer readable media.

(ii) Related Art

Japanese Unexamined Patent Application Publication No. 2003-233740 describes a system for reserving a facility, such as a bathroom.

SUMMARY

In the related art, there is a service that may be reserved by designating the time and date in advance and becomes usable when the reserved time frame is reached. For example, in a case where such a service to be provided is a private room serving as a work place, if there are many other private rooms in the vicinity of the reserved private room, it is assumable that a user may mistakenly arrive at another private room different from the reserved private room and may not be able to receive the provided service even when the reserved time frame is reached.

Aspects of non-limiting embodiments of the present disclosure relate to making it recognizable that an entry to a reserved private room has not been made during a reserved time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to provide a notification about reservation information related to a reservation of a reserved private room in a case where an entry to the private room is not confirmable before a predetermined time from a usage start time point according to the reservation of the private room.

BRIEF DESCRIPTION OF THE DRAWINGS

Exemplary embodiments of the present disclosure will be described in detail based on the following figures, wherein:

FIG. 29 illustrates a fifth display example showing the reservation information; and FIG. 30 illustrates a sixth display example showing the reservation information.

DETAILED DESCRIPTION

First Exemplary Embodiment

Figure 1:
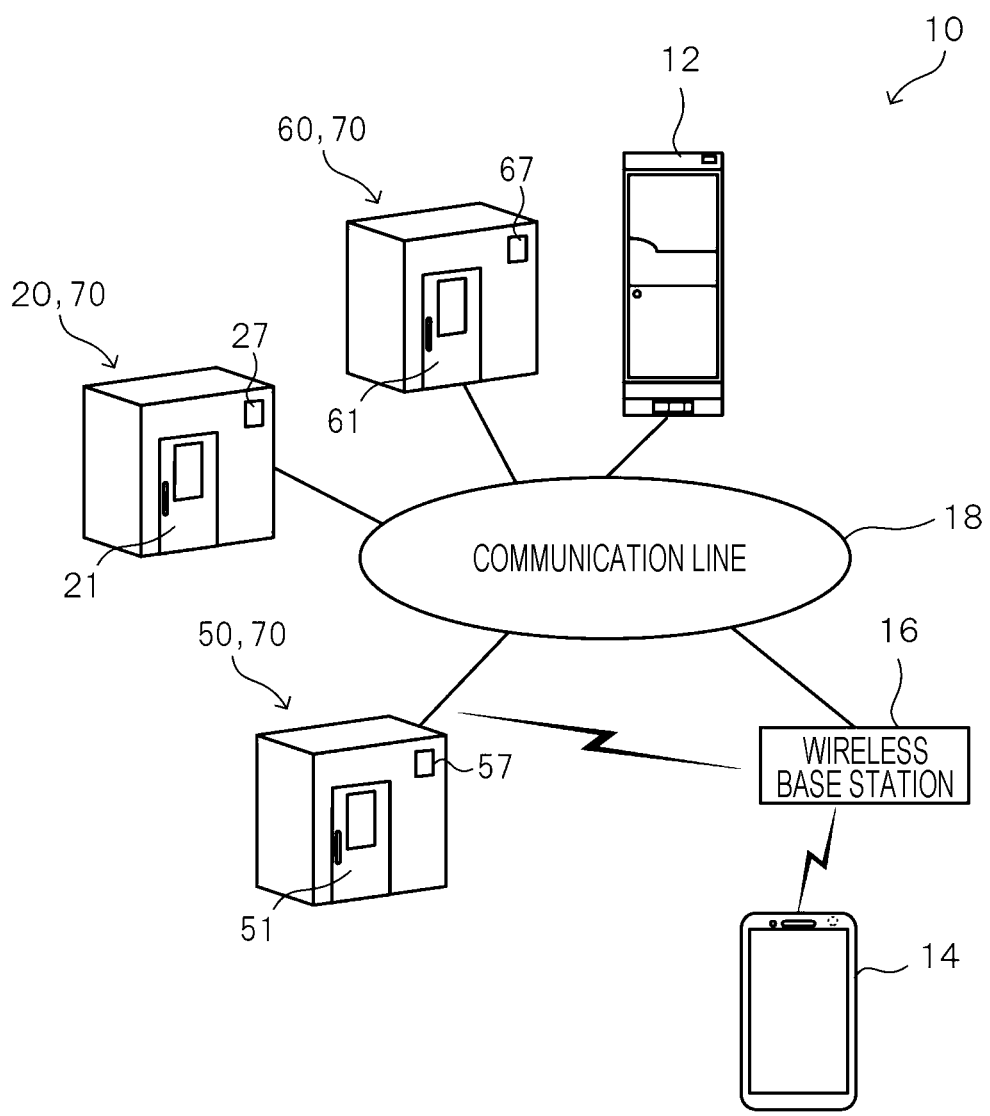
FIG. 1 schematically illustrates the configuration of an information processing system.

A first exemplary embodiment will be described in detail below with reference to the drawings. FIG. 1 schematically illustrates the configuration of an information processing system 10 according to this exemplary embodiment.

As shown in FIG. 1, the information processing system 10 according to this exemplary embodiment includes a cloud server 12 as an information processing apparatus, a wireless base station 16, and work booths 70, such as a private room 20, a private room 50, and a private room 60. Each work booth 70 is an example of a private room.

The cloud server 12, the wireless base station 16, and the work booths 70 are connected to a communication line 18.

The cloud server 12 performs processes related to the work booths 70. Examples of the processes related to the work booths 70 performed by the cloud server 12 include a reservation process for receiving reservations for the work booths 70, an unlocking process for unlocking the door of each reserved work booth 70, and a notification process for providing a notification about reservation information related to the reservation of each work booth 70.

The wireless base station 16 wirelessly connects to a portable terminal apparatus 14, such as a smartphone, connects the portable terminal apparatus 14 to the communication line 18, and communicates with, for example, an apparatus connected to the communication line 18. The portable terminal apparatus 14 used may be a smartphone, a tablet terminal, a notebook-type personal computer (PC), an earphone-type bearable terminal that receives and outputs sound, or a wearable terminal of any of various types, such as a watch type, an eyeglasses type, a wristband type, a clip type, a head mounted display type, or a strap type.

Figure 2:
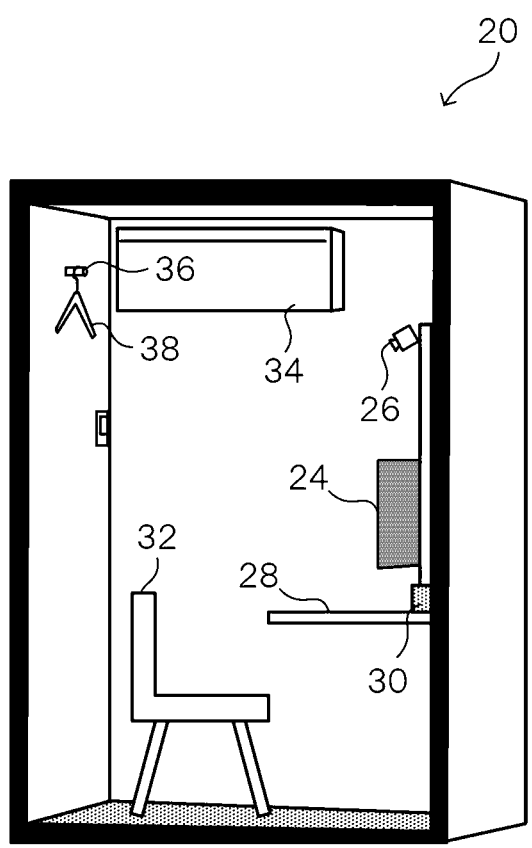
FIG. 2 schematically illustrates the configuration of a private room.

Because the work booths 70 have identical configurations, the private room 20 will be representatively described below. FIG. 2 schematically illustrates the configuration of the private room 20, and FIG. 3 is a block diagram illustrating an electrical configuration of the private room 20.

In this exemplary embodiment, for example, the private room 20 is provided with equipment to be used for teleworking. In detail, the private room 20 is equipped with a door 21 shown in FIG. 1, a desk 28, a chair 32, a power and universal serial bus (USB) outlet 30, a display 24, an air conditioner 34, and a camera 26 shown in FIG. 2, as well as a controller 22, a door locking device 40, a detector 42, and a notifier 44 shown in FIG. 3. In addition to the above components, the private room 20 is also equipped with, for example, a hook 36 (see FIG. 2) for hanging stationery or a hanger 38.

Figure 3:
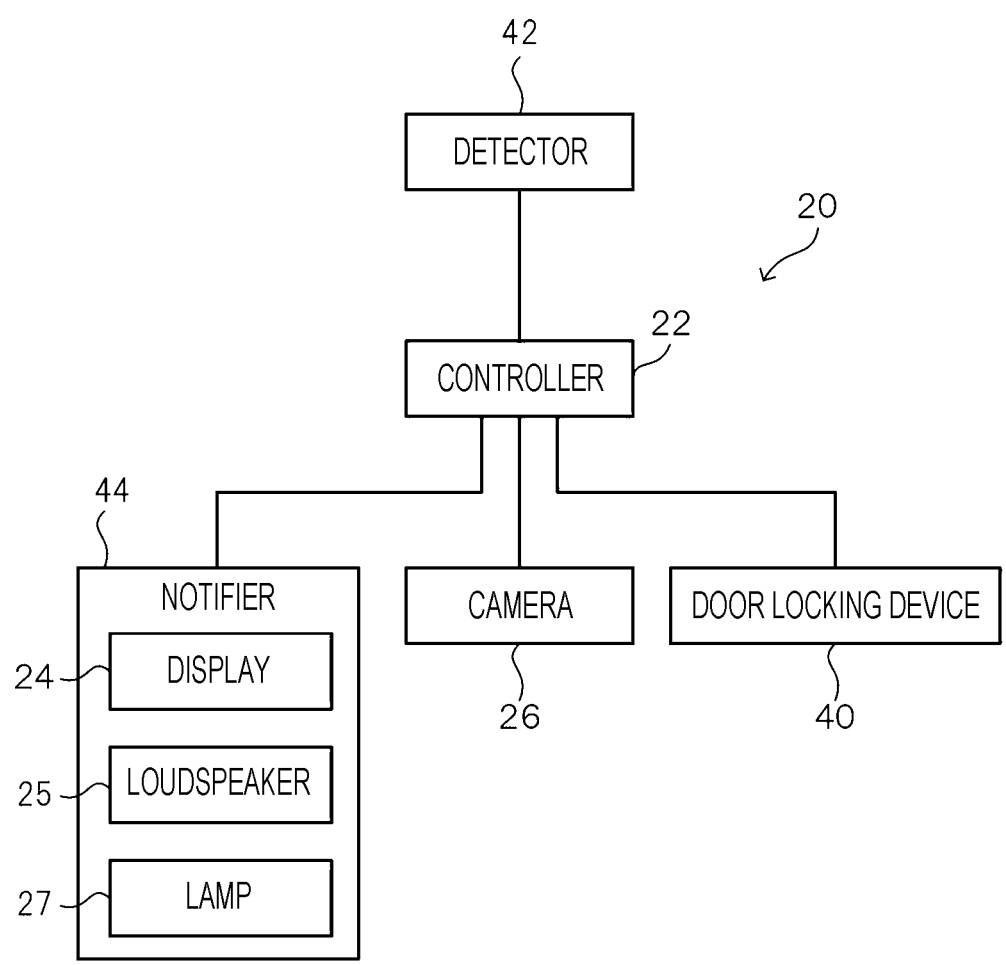
FIG. 3 is a block diagram illustrating an electrical configuration of the private room.

As shown in FIG. 3, in the private room 20, the controller 22 is connected to the camera 26, the door locking device 40, the detector 42, and the notifier 44.

The controller 22 is provided in the private room 20 and exchanges various types of signals with an apparatus, such as the cloud server 12, connected to the communication line 18. The controller 22 controls the equipment provided in the private room 20. An example of the control performed by the controller 22 includes supplying and cutting off electric power to and from the power and USB outlet 30 and devices, such as the air conditioner 34.

The camera 26 captures an interior image of the private room 20 and transmits the captured image to the cloud server 12 via the controller 22 and the communication line 18. The camera 26 may be configured to capture an exterior image of the private room 20 in addition to the interior image of the private room 20.

The door locking device 40 is provided in the door 21 and is an electronic lock that is lockable and unlockable at least in accordance with a command from the cloud server 12. For example, when the door locking device 40 receives an unlocking command from the cloud server 12 via the communication line 18 and the controller 22, the door locking device 40 unlocks the door 21. Furthermore, for example, when the door locking device 40 receives a locking command from the cloud server 12 via the communication line 18 and the controller 22, the door locking device 40 locks the door 21. The door locking device 40 also locks or unlocks the door 21 when various types of switches installed in the private room 20 are operated. When the door locking device 40 performs locking or unlocking, the door locking device 40 transmits the performed content to the cloud server 12 via the controller 22 and the communication line 18.

The detector 42 is provided inside the door 21 and the private room 20, detects various types of information, and transmits the detected contents to the cloud server 12 via the controller 22 and the communication line 18. For example, the detector 42 is constituted of sensors, such as a photoelectric sensor, a contact sensor, and a vibration sensor. The detector 42 may include another sensor in addition to the aforementioned sensors, or does not have to include one or more of the aforementioned sensors. In the first exemplary embodiment, the above-described detector 42 is configured to detect an opening-closing operation of the door 21 and also to detect whether or not a person is inside the private room 20 by being used as a human sensor.

The notifier 44 is constituted of the display 24, a loudspeaker 25, and a lamp 27.

The display 24 displays various types of notification information to the user. For example, the display 24 displays information received from the cloud server 12. In addition to displaying various types of information inside the private room 20, the display 24 may display various types of information outside the private room 20.

The loudspeaker 25 outputs various types of notification sound to the user. For example, the loudspeaker 25 outputs information received from the cloud server 12. The loudspeaker 25 may include an internal loudspeaker for outputting various types of sound inside the private room 20 and an external loudspeaker for outputting various types of sound outside the private room 20.

The lamp 27 emits notification light to the user by using various types of lighting patterns and colors. For example, the lamp 27 emits light with a lighting pattern and color based on information received from the cloud server 12.

Figure 4:
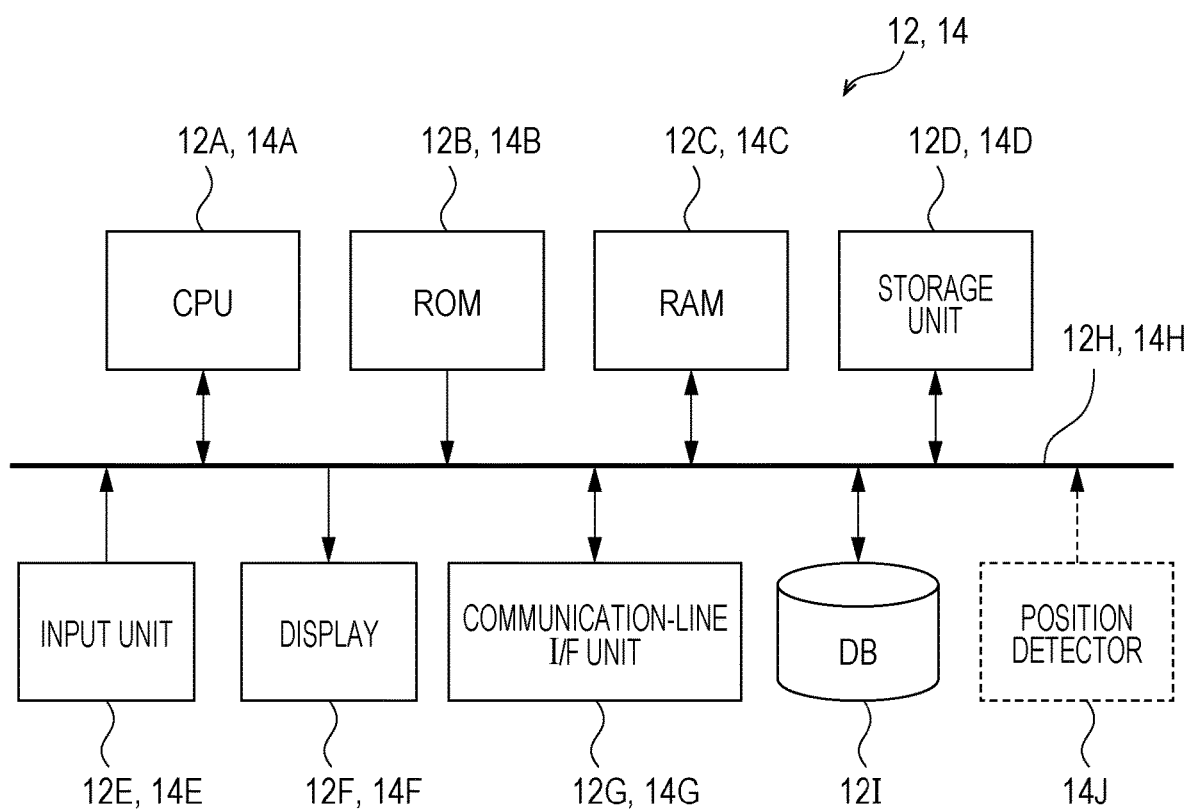
FIG. 4 is a block diagram illustrating the configuration of an electric system of a cloud server and a portable terminal apparatus.

Next, the schematic configuration of the cloud server 12 and the portable terminal apparatus 14 will be described. FIG. 4 is a block diagram illustrating the configuration of an electric system of the cloud server 12 and the portable terminal apparatus 14 in the information processing system 10 according to this exemplary embodiment. Because the cloud server 12 and the portable terminal apparatus 14 are both basically normal computers, the cloud server 12 will be representatively described.

As shown in FIG. 4, the cloud server 12 according to this exemplary embodiment includes a central processing unit (CPU) 12A as an example of a processor, a read only memory (ROM) 12B, a random access memory (RAM) 12C, a storage unit 12D, an input unit 12E, a display 12F, and a communication-line interface (I/F) unit 12G.

The CPU 12A controls the overall operation of the cloud server 12, including executing various types of programs and controlling the individual components. Specifically, the CPU 12A reads a program from the ROM 12B or the storage unit 12D and executes the program by using the RAM 12C as a work area. The CPU 12A controls the individual components and performs various types of arithmetic processes in accordance with programs stored in the ROM 12B or the storage unit 12D. In the first exemplary embodiment, an information processing program for executing at least the unlocking process and the notification process to be described later is stored in the ROM 12B or the storage unit 12D. The information processing program may be preliminarily installed in the cloud server 12, or may be installed in the cloud server 12, where appropriate, by being stored in a nonvolatile storage medium or by being distributed via the communication line 18. Assumed examples of the nonvolatile storage medium include a CD-ROM, a magnetic-optical disk, a hard disk drive (HDD), a DVD-ROM, a flash memory, and a memory card.

The ROM 12B stores various types of programs and various types of data. The RAM 12C serves as a work area for temporarily storing a program or data. The storage unit 12D is constituted of a storage device, such as an HDD, a solid state drive (SSD), or a flash memory, and stores various types of programs, including an operating system, and various types of data.

The input unit 12E is used for inputting various types of information. The input unit 12E is constituted of, for example, a pointing device, such as a mouse, various types of buttons, a keyboard, a microphone, and a camera.

The display 12F is used for displaying various types of information. The display 12F is of a touchscreen type and also functions as the input unit 12E.

The communication-line I/F unit 12G is an interface that is connected to the communication line 18 and that is provided for communicating with another apparatus connected to the communication line 18. For this communication, for example, a wired communication standard, such as Ethernet (registered trademark) or fiber distributed data interface (FDDI), or a wireless communication standard, such as 4G, 5G, or Wi-Fi (registered trademark), is used.

The individual components of the cloud server 12 are electrically connected to one another by a system bus 12H.

The cloud server 12 also includes a database (DB) 121 for storing various types of information, such as the installation location and the reservation status of each work booth 70 to be managed.

When the above-described information processing program is to be executed, the cloud server 12 uses the above-described hardware resources to execute a process based on the information processing program.

Other than being equipped with a position detector 14J indicated by a dashed line in FIG. 4, the portable terminal apparatus 14 is basically similar to the cloud server 12 in that the portable terminal apparatus 14 includes a CPU 14A as an example of a processor, a ROM 14B, and RAM 14C.

The position detector 14J detects the current location of the portable terminal apparatus 14. For example, since a signal from a Global Positioning System (GPS) satellite contains time data from an atomic clock installed in the satellite as well as information about the trajectory of the satellite, a radio wave is received from the GPS satellite, and the distance from the satellite is determined based on the difference between the transmission time point of the radio wave and the reception time point of the radio wave. Then, the current location of the portable terminal apparatus 14 is detected by measuring the position of a single spot in a space based on distances from three or more GPS satellites. As an alternative to or in addition to using GPS, the position detector 14J may detect the current location of the portable terminal apparatus 14 by using, for example, Bluetooth (registered trademark), Wi-Fi (registered trademark), and/or a beacon.

When any of the work booths 70 is to be used, the user has to reserve the work booth 70 from a dedicated website by using, for example, a smartphone or a personal computer. Then, the cloud server 12 performs the reservation process for receiving the reservation of the work booth 70. In place of or in addition to the aforementioned dedicated website, a dedicated application may be provided, and the cloud server 12 may perform a process related to the work booth 70, such as the reservation process, in response to a command from the application.

The flow of the reservation process will be described below with reference to FIGS. 5 to 8. The following description relates to an example where the user reserves the work booth 70 by using the portable terminal apparatus 14.

Figure 5:
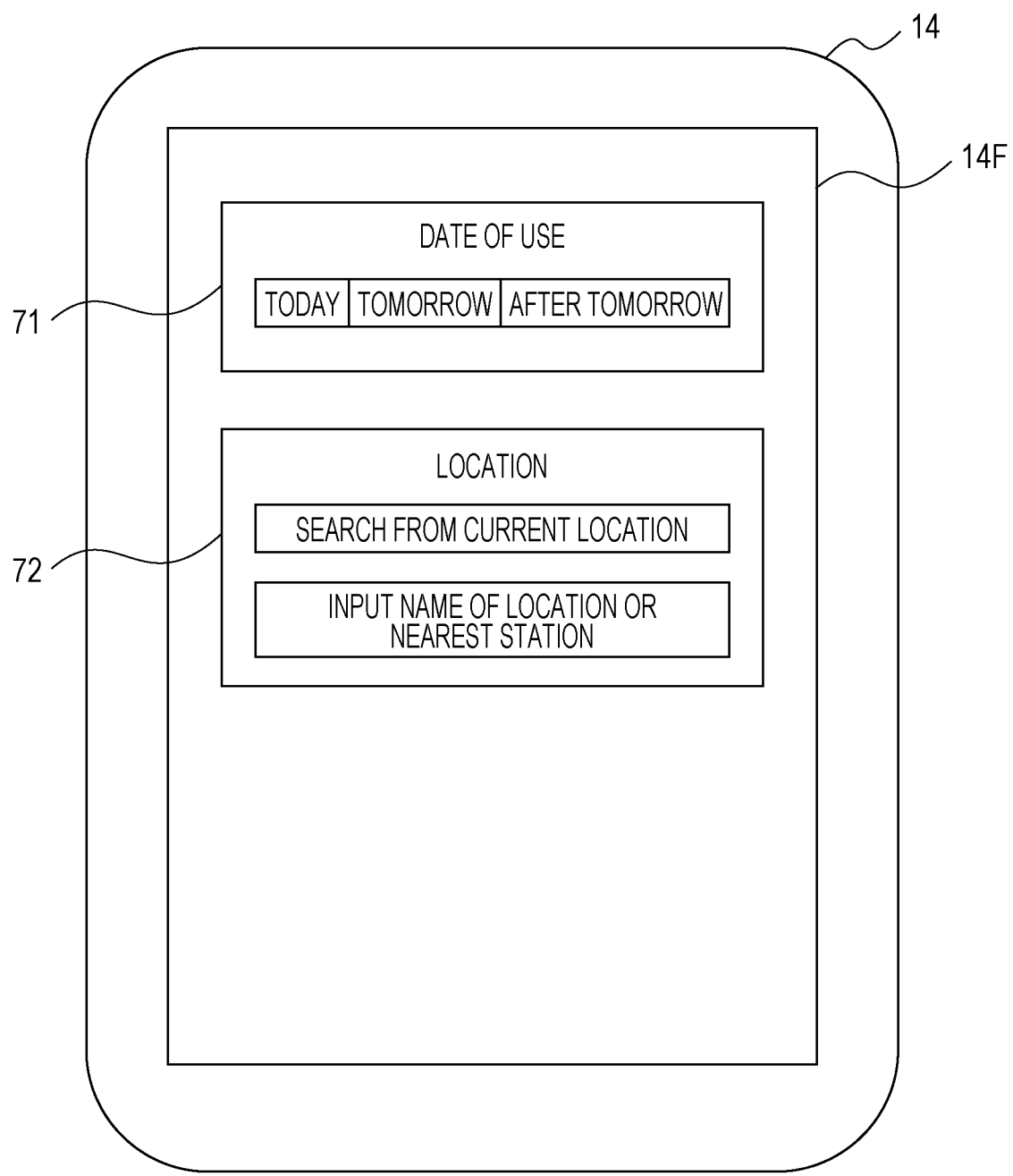
FIG. 5 illustrates a first display example of a reservation process.

FIG. 5 illustrates a first display example of the reservation process. When the CPU 12A of the cloud server 12 receives a command for starting the reservation process after the user logs into the aforementioned website, the CPU 12A causes a display 14F of the portable terminal apparatus 14 to display the first display example shown in FIG. 5.

The display 14F shown in FIG. 5 displays a date-of-use input section 71 and a location input section 72.

The date-of-use input section 71 is a section to which the user inputs a desired date for using the work booth 70. In FIG. 5, for example, the date-of-use input section 71 displays three items, namely, "today", "tomorrow", and "after tomorrow" options. If the "today" or "tomorrow" option is selected, the current date on which the reservation process is performed or the following date is input as the date of use. If the "after tomorrow" option is selected, for example, a calendar is displayed to make the user select a date after the date subsequent to the date on which the reservation process is performed, and the selected date is input as the date of use.

The location input section 72 is a section to which the user inputs the location of the work booth 70 that the user desires to use. In FIG. 5, for example, the location input section 72 displays two items, namely, "search from current location" and "input name of location or nearest station" options. If the "search from current location" option is selected, a work booth 70 located within a predetermined distance (e.g., within 1 km) from the current location of the portable terminal apparatus 14 is displayed as candidate information 73 (see FIG. 6) to be described later. If the "input name of location or nearest station" option is selected, the user is made to input a search keyword, such as the name of the location or the nearest station, and a work booth 70 located within a predetermined distance (e.g., within 1 km) from the location set in accordance with the input search keyword is displayed as the candidate information 73 (see FIG. 6).

Figure 6:
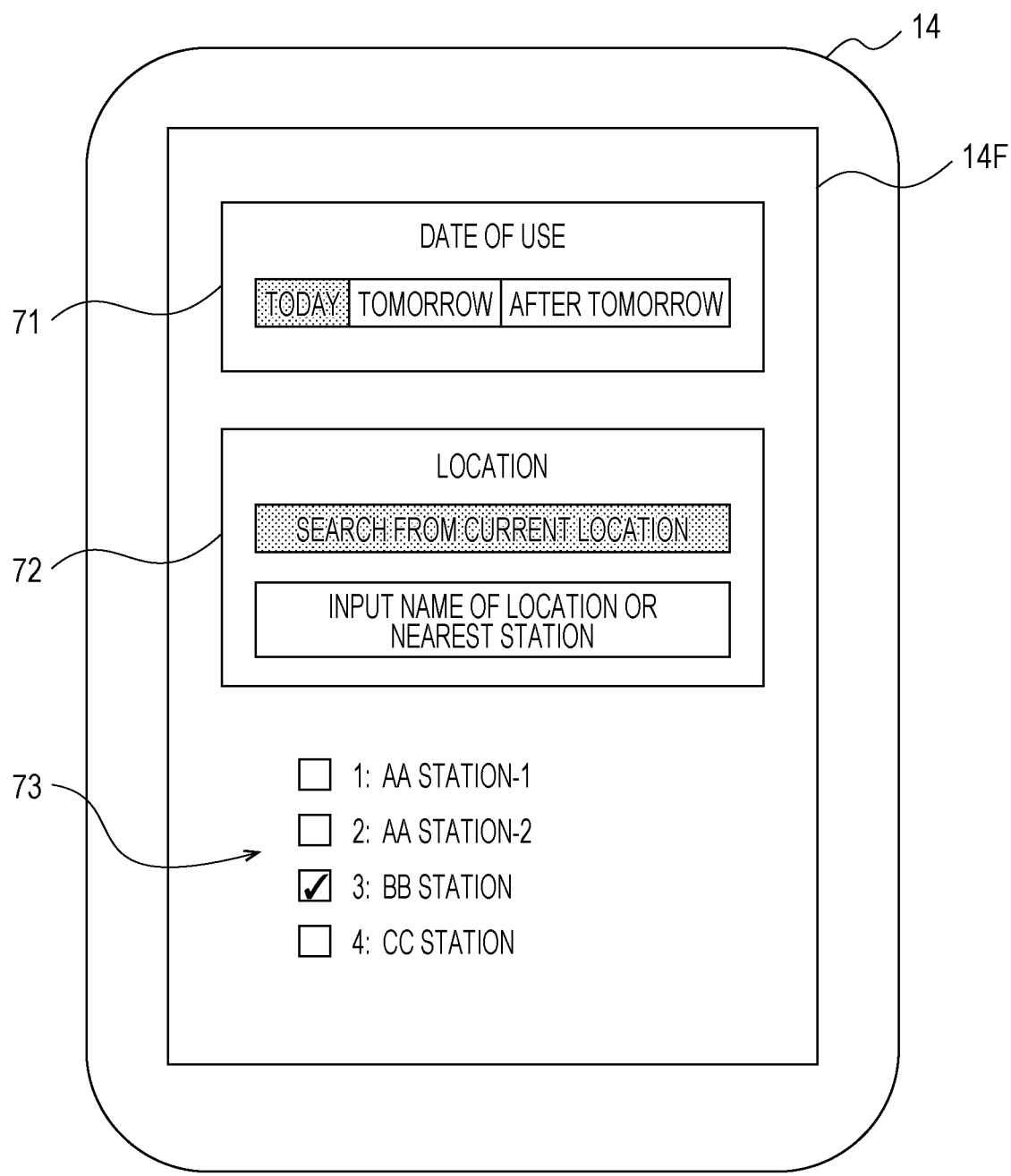
FIG. 6 illustrates a second display example of the reservation process.

FIG. 6 illustrates a second display example of the reservation process. When information is input to each of the date-of-use input section 71 and the location input section 72, the CPU 12A causes the display 14F to display the second display example shown in FIG. 6. FIG. 6 illustrates an example of a state where the "today" option is selected in the date-of-use input section 71 and the "search from current location" option is selected in the location input section 72.

In the second display example shown in FIG. 6, the candidate information 73 is displayed in addition to the first display example shown in FIG. 5. The candidate information 73 includes multiple candidates and checkboxes used for selecting a specific candidate from the multiple candidates. For example, in FIG. 6, multiple candidates of work booths 70 corresponding to the information input to the date-of-use input section 71 and the information input to the location input section 72 are displayed as the candidate information 73. For example, FIG. 6 illustrates a state where a checkmark is given to the checkbox for "3: BB station" among the multiple candidates of work booths 70.

Figure 7:
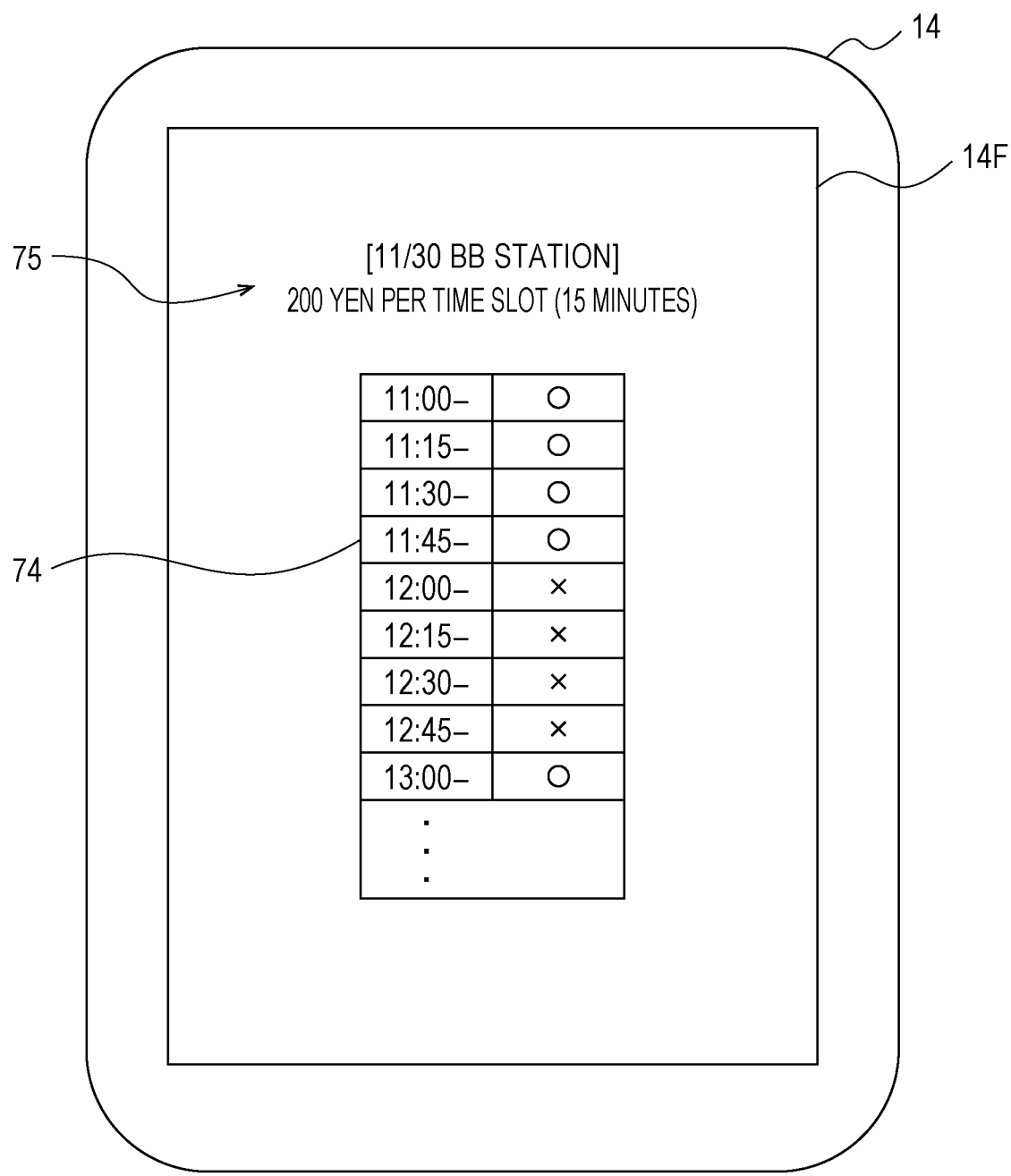
FIG. 7 illustrates a third display example of the reservation process.

FIG. 7 illustrates a third display example of the reservation process. If a checkmark is given to at least one checkbox among the multiple candidates of work booths 70 displayed as the candidate information 73, the CPU 12A causes the display 14F to display the third display example shown in FIG. 7.

The display 14F shown in FIG. 7 displays time frame information 74 and message information 75.

The time frame information 74 includes available time frames of the work booth 70 selected as the aforementioned specific candidate, and reservable time frames of the work booth 70. For example, in FIG. 7, as the time frame information 74, the available time frames of the work booth 70 are displayed in units of 15 minutes per time slot, and the reservation status of each time slot is displayed as a circle or a cross. A circle indicates a reservable status, whereas a cross indicates a non-reservable status. A non-reservable status includes a case where the reservable time has already passed, as well as a case where the time slot is already reserved. Accordingly, in the first exemplary embodiment, the reservable time frames of the work booth 70 are indicated by using a circle or a cross as the reservation status. There may be a case where the time frame information 74 is displayed with a cross before and after consecutive reservations.

The message information 75 indicates various messages for the user. For example, the message information 75 displayed in FIG. 7 reads "[November 2030, B STATION] 200 YEN PER TIME SLOT (15 MIN.)".

Because FIG. 7 is a display example where there is only one work booth 70 in the vicinity of BB station, only one column is displayed for the reservation status displayed as a circle or a cross. However, for example, if there are three work booths 70 in the vicinity of BB station, the reservation status displayed as a circle or a cross is displayed in three columns in correspondence with the three work booths 70.

Figure 8:
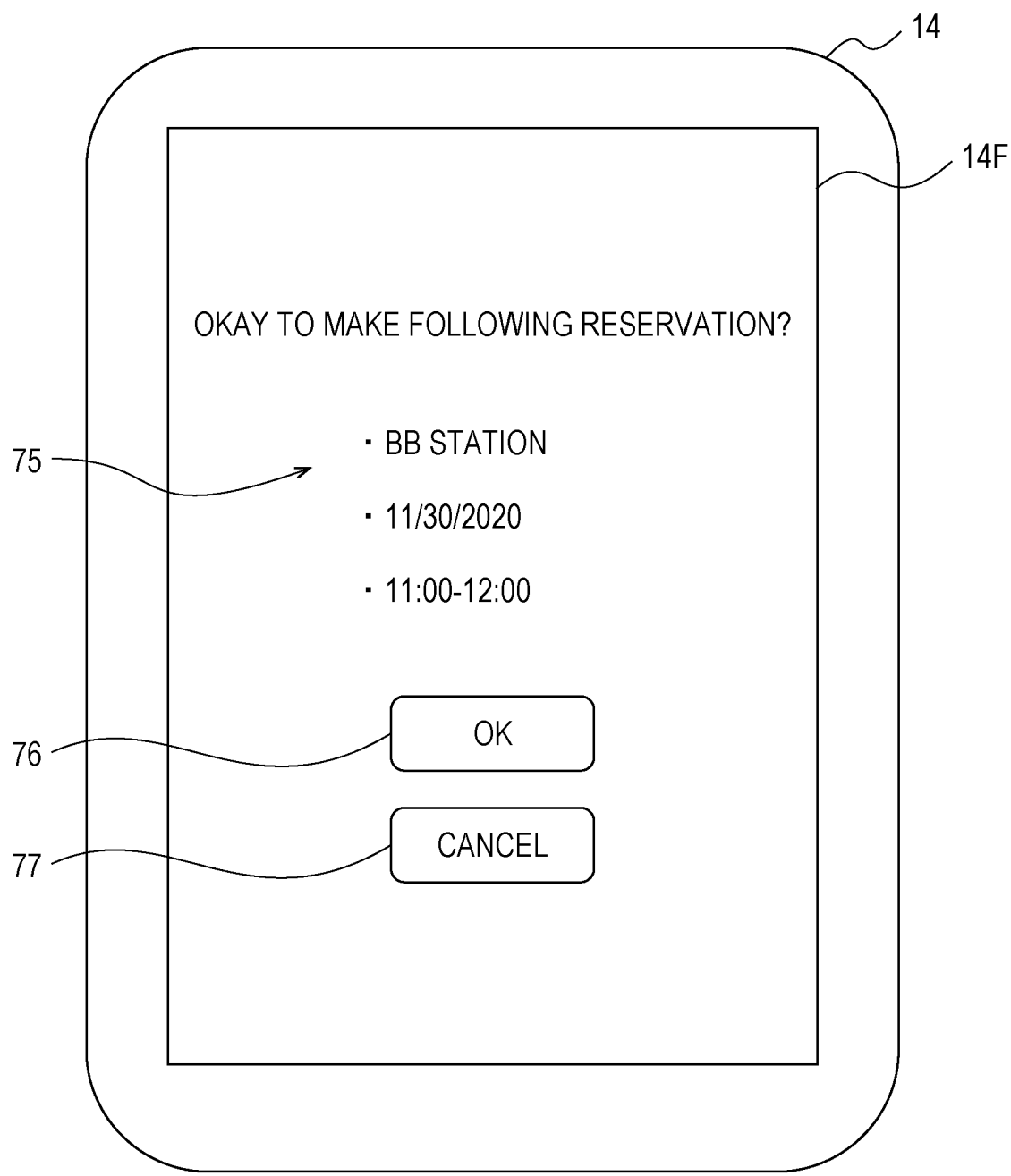
FIG. 8 illustrates a fourth display example of the reservation process.

FIG. 8 illustrates a fourth display example of the reservation process. If the CPU 12A receives designation of a freely-chosen time frame among the reservable time frames of the work booth 70 displayed as the time frame information 74, the CPU 12A causes the display 14F to display the fourth display example shown in FIG. 8. For example, the CPU 12A causes the display 14F to display the fourth display example shown in FIG. 8 when the CPU 12A receives designation of time frames "11:00-", "11:15-", "11:30-", and "11:45-" as freely-chosen time frames among the time frames displayed with circles in the time frame information 74 shown in FIG. 7.

The display 14F shown in FIG. 8 displays the message information 75, an OK button 76, and a cancel button 77. For example, the message information 75 displayed in FIG. 8 reads "OKAY TO MAKE FOLLOWING RESERVATION? BB STATION, Nov. 30, 2020, 11:00-12:00". In the first exemplary embodiment, when the user operates the OK button 76 while the fourth display example is being displayed, the CPU 12A completes the reservation process and reserves the work booth 70 based on the contents of the message information 75 shown in FIG. 8. In contrast, in the first exemplary embodiment, when the user operates the cancel button 77 while the fourth display example is being displayed, the CPU 12A aborts the reservation process and changes the display 14F to predetermined display contents.

When the CPU 12A completes the reservation process and reserves the work booth 70, the CPU 12A causes the storage unit 12D to store the reservation status with respect to the reservation. Accordingly, the reservation status of each work booth 70 stored in the storage unit 12D includes information about the time of use of the work booth 70, the location thereof, and the user who is to use the work booth 70.

Figure 9:
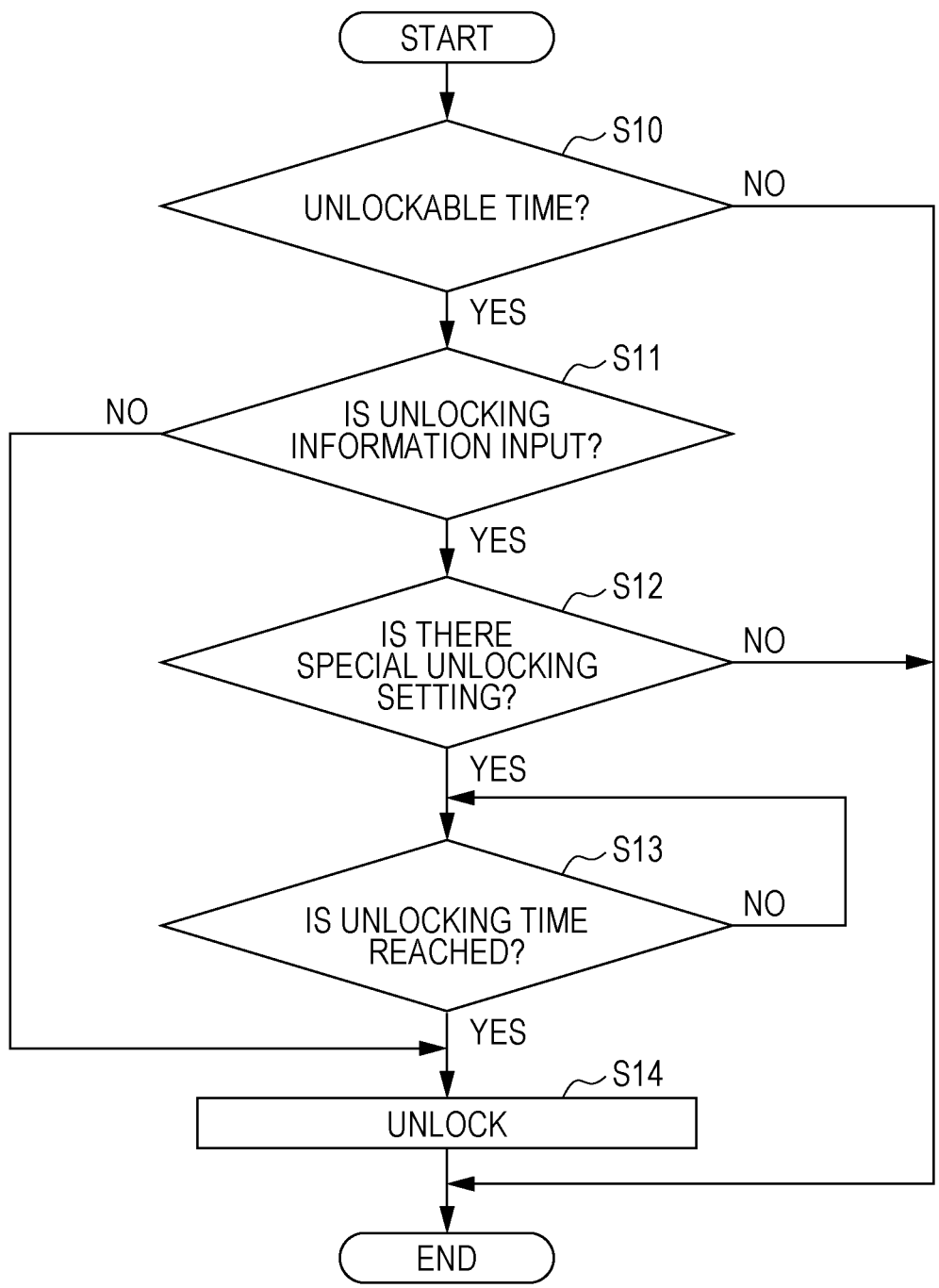
FIG. 9 is a flowchart illustrating the flow of an unlocking process.

FIG. 9 is a flowchart illustrating the flow of the unlocking process for unlocking the door of the reserved work booth 70. The CPU 12A reads the information processing program from the ROM 12B or the storage unit 12D, loads the information processing program in the RAM 12C, and executes the information processing program, whereby the unlocking process is performed by the cloud server 12.

In step S10 shown in FIG. 9, the CPU 12A determines whether or not the door of the work booth 70 reserved by a predetermined user is in an unlockable time. If the CPU 12A determines that the door is in an unlockable time (YES in step S10), the process proceeds to step S11. In contrast, if the CPU 12A determines that the door is not in an unlockable time (NO in step S10), the process ends. In the first exemplary embodiment, the aforementioned "unlockable time" is a "usage start time point at which the predetermined user starts to use the work booth 70". Alternatively, if a time point immediately prior to the usage start time point is in a time frame in which the work booth 70 is reservable, that is, if the work booth 70 is available, the CPU 12A may determine that the door is in the aforementioned "unlockable time" from, for example, 5 minutes or 7 minutes prior to the usage start time point.

In step S11, the CPU 12A determines whether or not unlocking information for unlocking the door of the work booth 70 reserved by the predetermined user is input. If the CPU 12A determines that unlocking information is not input (YES in step S11), the process proceeds to step S12. In contrast, if the CPU 12A determines that unlocking information is input (NO in step S11), the process proceeds to step S14.

In step S12, the CPU 12A determines whether or not the door of the work booth 70 reserved by the predetermined user is given a special unlocking setting. If the CPU 12A determines that the door is given a special unlocking setting (YES in step S12), the process proceeds to step S13. In contrast, if the CPU 12A determines that the door is not given a special unlocking setting (NO in step S12), the process ends. Special unlocking involves unlocking the door of the work booth 70 without input of unlocking information. In contrast, unlocking of the door of the work booth 70 by using input unlocking information is referred to as "normal unlocking".

The flow of a special unlocking setting process will now be described with reference to FIGS. 10 to 13.

Figure 10:
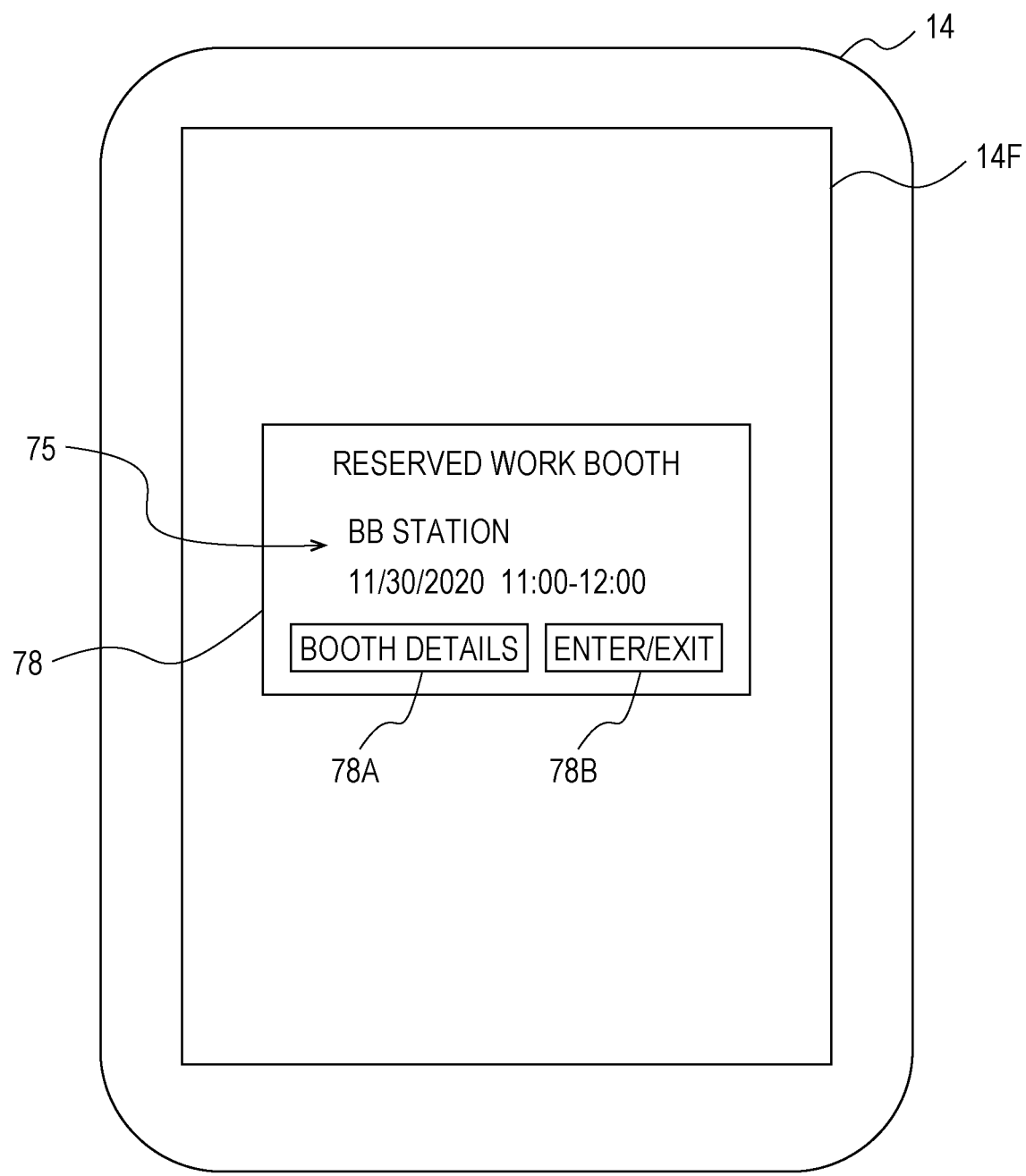
FIG. 10 illustrates a display example showing a reserved work booth.

FIG. 10 illustrates a display example showing a reserved work booth 70. When the CPU 12A of the cloud server 12 receives a command for displaying the reserved work booth 70 after the user logs into the aforementioned website, the CPU 12A causes the display 14F of the portable terminal apparatus 14 to display the display example shown in FIG. 10. In the first exemplary embodiment, the display example shown in FIG. 10 is displayed on a top screen immediately after the user logs into the aforementioned website.

The display 14F shown in FIG. 10 displays work booth information 78 about the reserved work booth 70. This work booth information 78 includes the message information 75, a booth details button 78A, and an enter/exit button 78B.

For example, the message information 75 displayed in FIG. 10 reads "RESERVED WORK BOOTH: BB STATION, Nov. 30, 2020, 11:00-12:00". In the first exemplary embodiment, when the user operates the booth details button 78A while the display example shown in FIG. 10 is being displayed, the CPU 12A changes the display contents of the display 14F to display contents (see FIG. 11) indicating the details of the reserved work booth 70. Furthermore, in the first exemplary embodiment, when the user operates the enter/exit button 78B while the display example shown in FIG. 10 is being displayed, the CPU 12A changes the display contents of the display 14F to display contents (see FIG. 14) indicating entry-exit-related information with respect to the reserved work booth 70.

Figure 11:
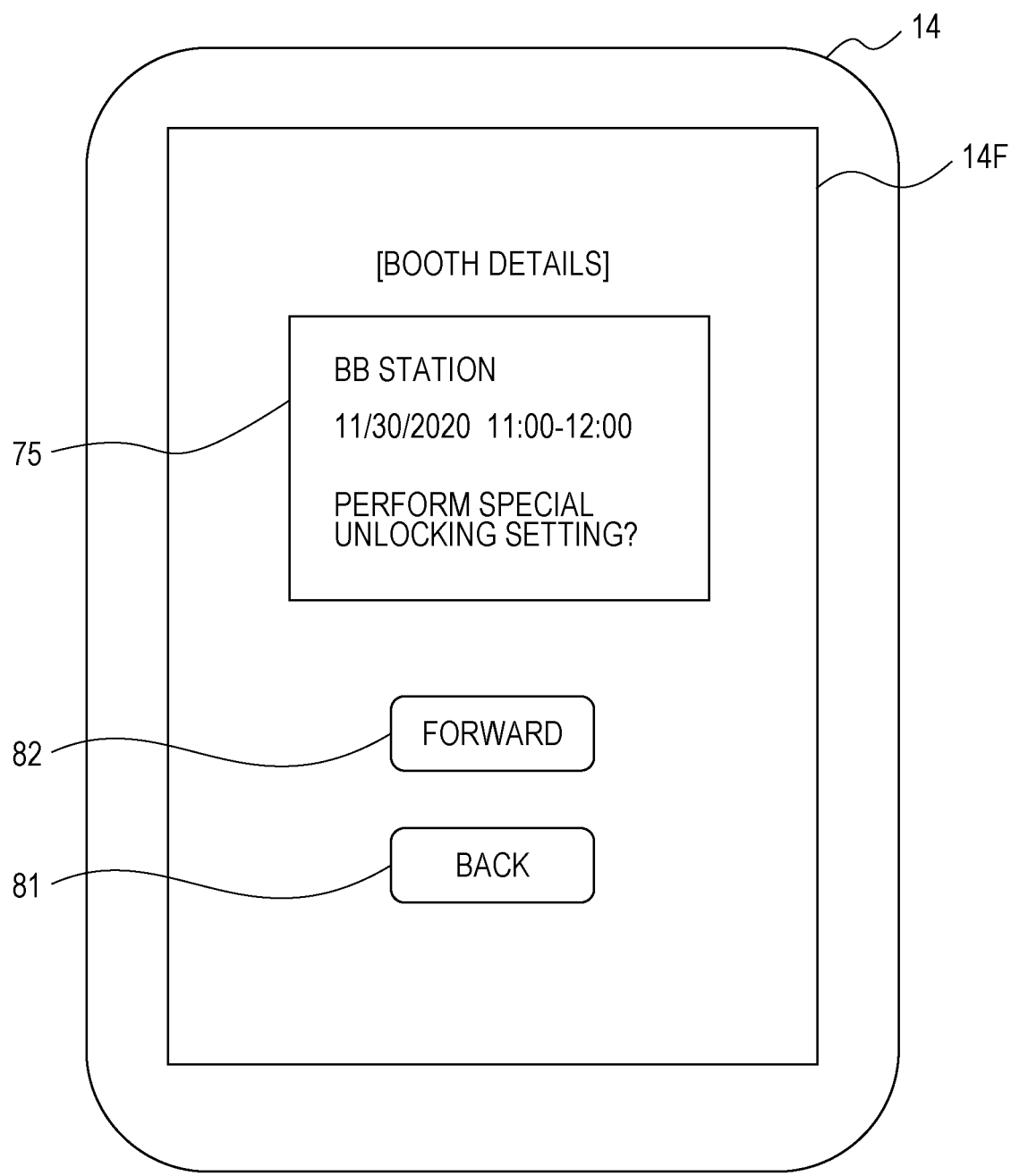
FIG. 11 illustrates a display example after a booth details button is operated.

FIG. 11 illustrates a display example after the booth details button 78A is operated. The display 14F shown in FIG. 11 displays the message information 75, a forward button 82, and a back button 81.

For example, the message information 75 displayed in FIG. 11 reads "BB STATION, Nov. 30, 2020, 11:00-12:00, PERFORM SPECIAL UNLOCKING SETTING?".

Figure 12:
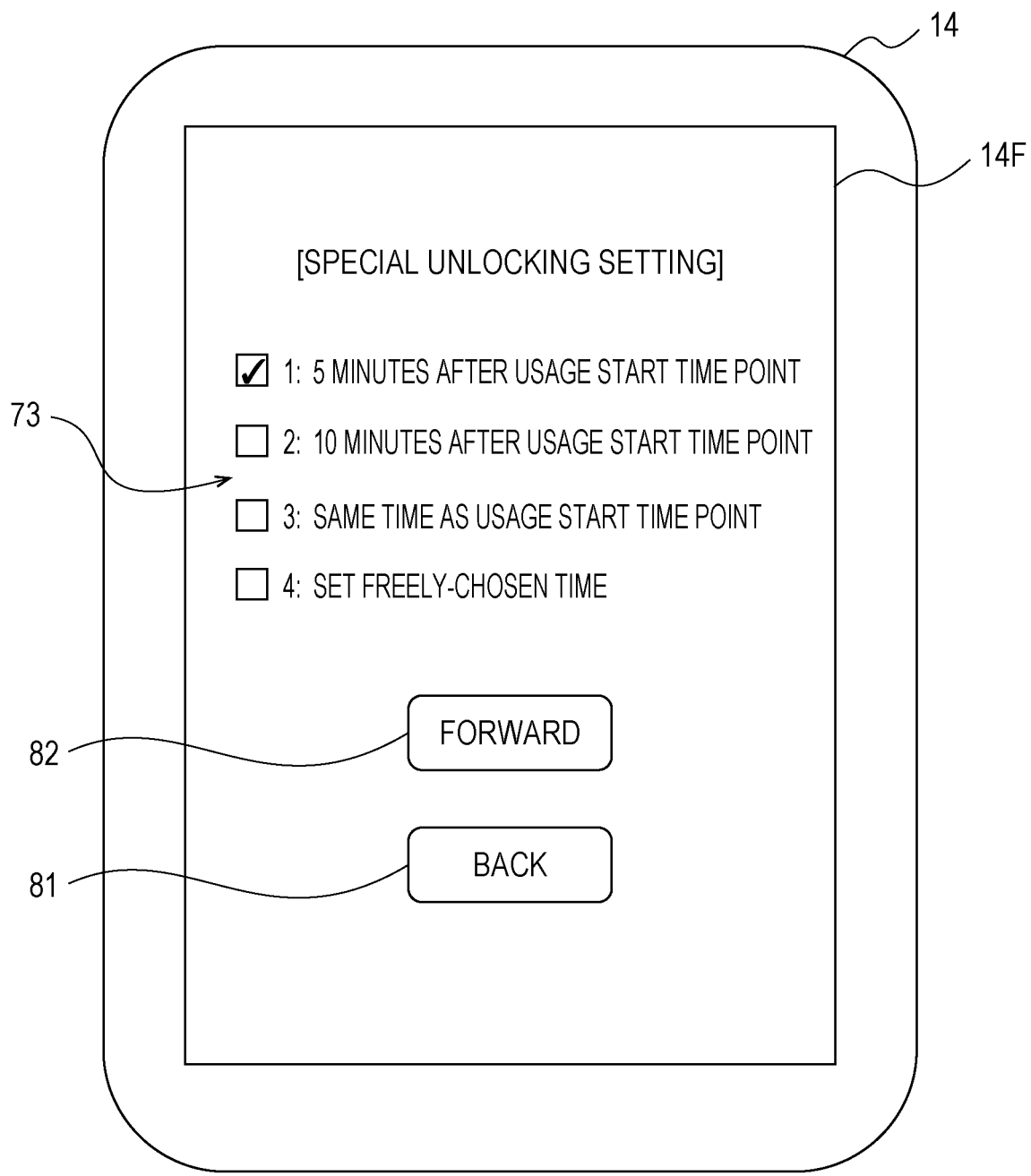
FIG. 12 illustrates a first display example after a forward button is operated.

In the first exemplary embodiment, when the user operates the forward button 82 while the display example shown in FIG. 11 is being displayed, the CPU 12A changes the display contents of the display 14F to display contents in a display example shown in FIG. 12. In contrast, in the first exemplary embodiment, when the user operates the back button 81 while the display example shown in FIG. 11 is being displayed, the CPU 12A changes the display contents of the display 14F to the display contents in the display example shown in FIG. 10.

FIG. 12 illustrates a first display example after the forward button 82 is operated. The display 14F shown in FIG. 12 displays the candidate information 73, the forward button 82, and the back button 81.

For example, the candidate information 73 displayed in FIG. 12 includes multiple unlocking-time candidates for performing special unlocking on the door of the reserved work booth 70 at or after the usage start time point of the work booth 70. Moreover, in FIG. 12, for example, a checkmark is given to a checkbox for "1: 5 MINUTES AFTER USAGE START TIME POINT" among the multiple unlocking-time candidates.

Figure 13:
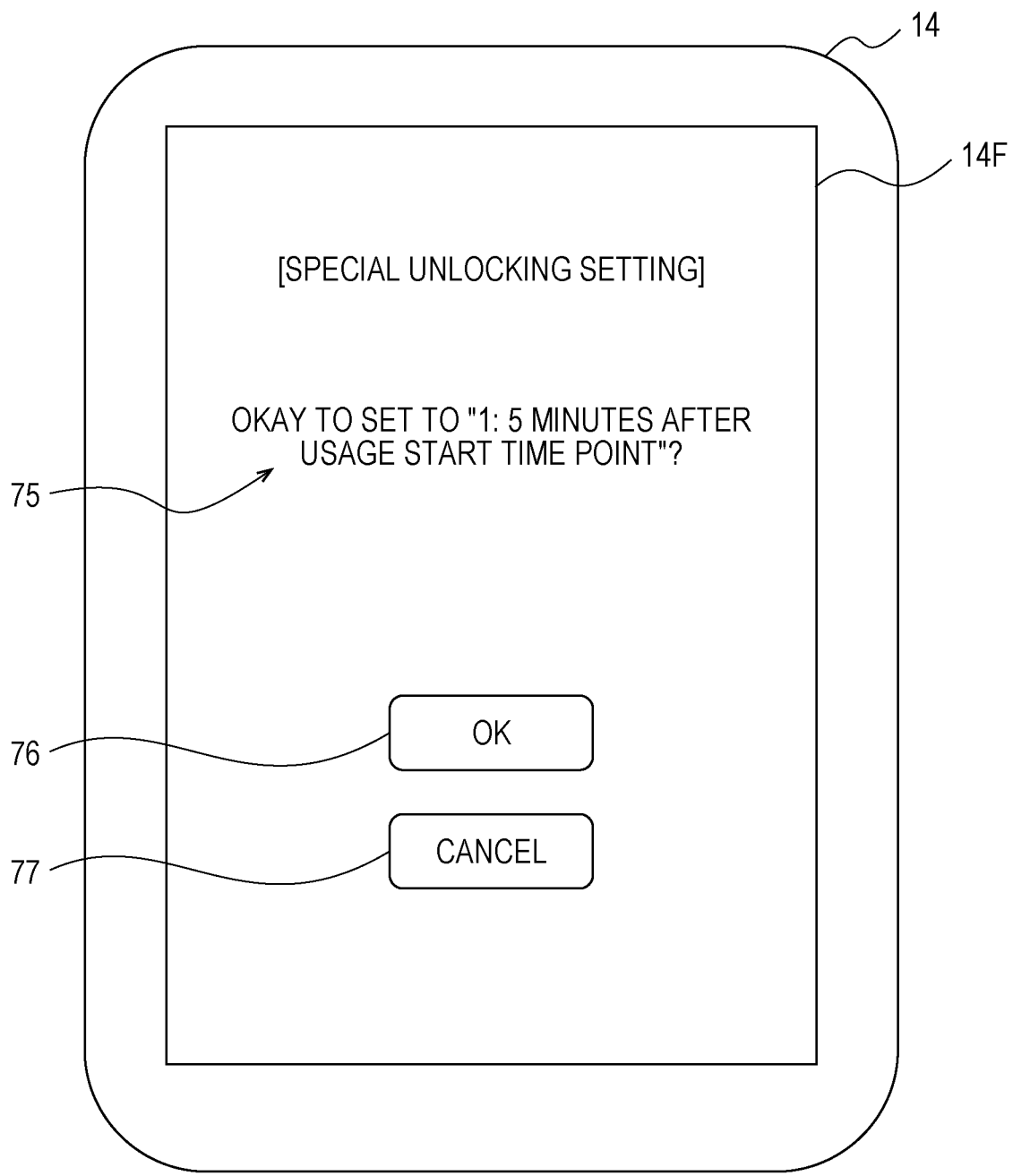
FIG. 13 illustrates a second display example after the forward button is operated.

In the first exemplary embodiment, when the user operates the forward button 82 after giving a checkmark to any of the checkboxes in the candidate information 73 shown in FIG. 12, the CPU 12A changes the display contents of the display 14F to display contents in a display example shown in FIG. 13. In contrast, in the first exemplary embodiment, when the user operates the back button 81 while the display example shown in FIG. 12 is being displayed, the CPU 12A changes the display contents of the display 14F to the display contents in the display example shown in FIG. 10.

FIG. 13 illustrates a second display example after the forward button 82 is operated. The display 14F shown in FIG. 13 displays the message information 75, the OK button 76, and the cancel button 77. For example, the message information 75 displayed in FIG. 13 reads "[SPECIAL UNLOCKING SETTING] OKAY TO SET TO "1: 5 MINUTES AFTER USAGE START TIME POINT"?". In the first exemplary embodiment, when the user operates the OK button 76 while the display example shown in FIG. 13 is being displayed, the CPU 12A completes the special unlocking setting process and sets a special unlocking mode to the door of the reserved work booth 70. In contrast, in the first exemplary embodiment, when the user operates the cancel button 77 while the display example shown in FIG. 13 is being displayed, the CPU 12A aborts the special unlocking setting process and changes the display 14F to predetermined display contents.

As the message information 75 in each of the display examples in FIGS. 11 to 13, the CPU 12A may display a precaution for the special unlocking setting process. For example, a precaution to be additionally displayed in the display example shown in FIG. 11 by the CPU 12A may read "SPECIAL UNLOCKING SETTING WILL UNLOCK DOOR OF WORK BOOTH 70 WITHOUT INPUT OF UNLOCKING INFORMATION WHEN UNLOCKING TIME IS REACHED. IF USER INPUTS UNLOCKING INFORMATION AND ENTERS WORK BOOTH 70 BEFORE UNLOCKING TIME, SPECIAL UNLOCKING COMMAND WILL BE CANCELLED.". Moreover, a precaution to be additionally displayed in the display example shown in FIG. 13 by the CPU 12A may read "IF USER ENTERS WORK BOOTH 70 AFTER UNLOCKING TIME, LOCK MODE WILL RETURN TO NORMAL AUTO-LOCK MODE THEREAFTER".

Referring back to FIG. 9, in step S13, the CPU 12A determines whether or not the unlocking time for performing special unlocking on the door of the work booth 70 reserved by the predetermined user is reached. If the CPU 12A determines that the unlocking time is reached (YES in step S13), the process proceeds to step S14. In contrast, if the CPU 12A determines that the unlocking time is not reached (NO in step S13), step S13 is performed again. When the user operates the OK button 76 while the display example shown in FIG. 13 is being displayed, the unlocking time becomes "5 minutes after the usage start time point", and the CPU 12A determines in step S13 whether or not the unlocking time is reached.

In step S14, the CPU 12A unlocks the door of the work booth 70 reserved by the predetermined user. Then, the process ends. The "unlocking" in step S14 includes normal unlocking and special unlocking. For example, when the process proceeds to step S14 after the determination result obtained in step S11 indicates "NO", normal unlocking is performed based on the following flow.

Figure 14:
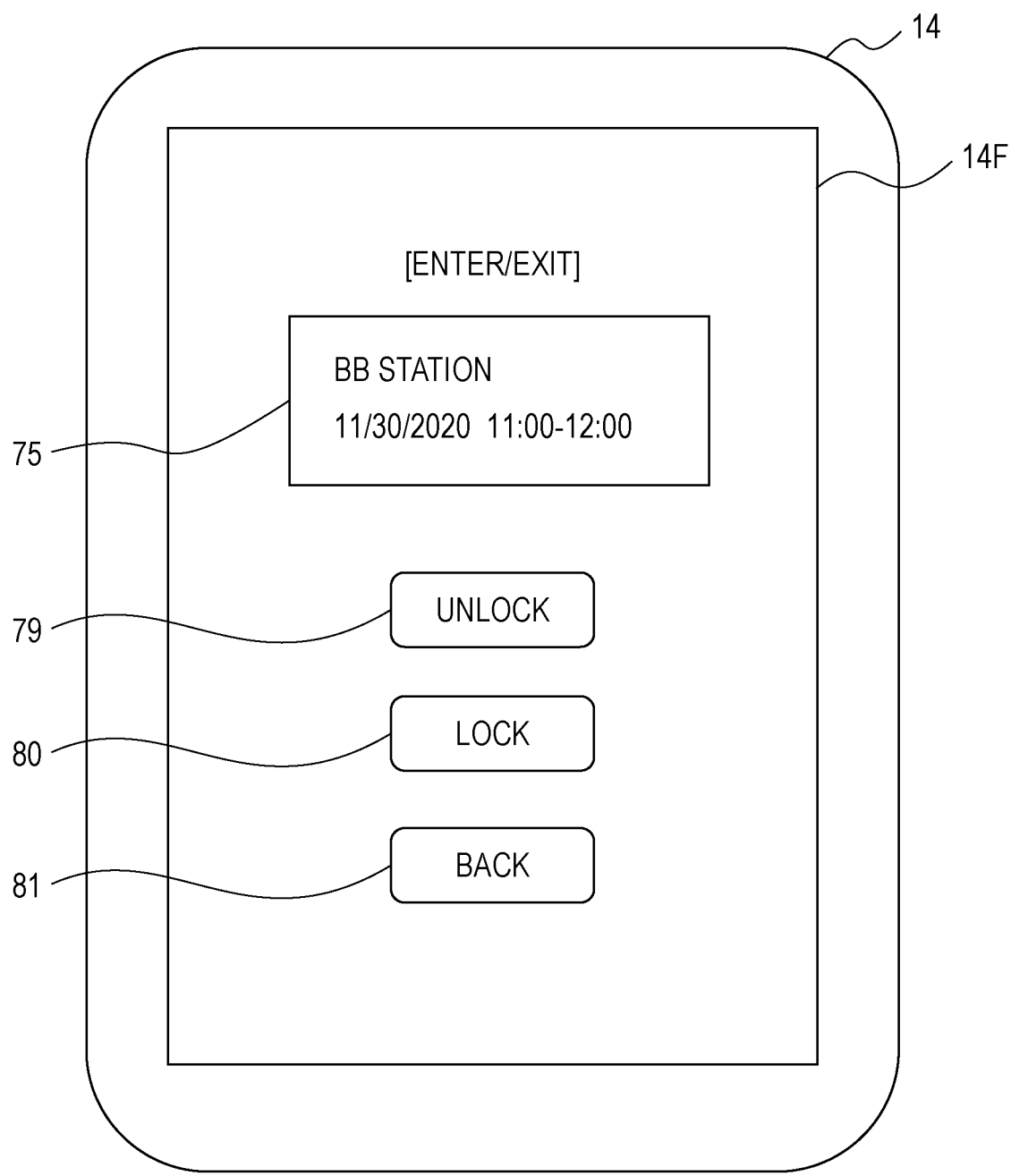
FIG. 14 illustrates a display example after an enter/exit button is operated.

FIG. 14 illustrates a display example after the enter/exit button 78B is operated. The display 14F shown in FIG. 14 displays the message information 75, an unlock button 79, a lock button 80, and the back button 81.

For example, the message information 75 displayed in FIG. 14 reads "BB STATION, Nov. 30, 2020, 11:00-12:00".

The unlock button 79 is to be operated for normal unlocking of the door of the reserved work booth 70. In the first exemplary embodiment, the unlock button 79 becomes operable at or after the unlockable time of the reserved work booth 70, whereby normal unlocking is performable on the door of the work booth 70. The CPU 12A does not display the unlock button 79 on the display 14F until the unlockable time is reached, so as to set the unlock button 79 in a non-operable state. Alternatively, the unlock button 79 may be displayed on the display 14F before the unlockable time is reached, but the CPU 12A may be configured not to perform normal unlocking even when the unlock button 79 is operated, that is, may set the unlock button 79 in a non-operable state.

For example, when the user operates the unlock button 79 while the display example shown in FIG. 14 is being displayed, the CPU 12A proceeds to step S14 after obtaining "NO" in step S11 shown in FIG. 9, and performs normal unlocking on the door of the work booth 70 in step S14.

The lock button 80 shown in FIG. 14 is to be operated for locking the door of the reserved work booth 70. In the first exemplary embodiment, the lock button 80 becomes operable when the door of the work booth 70 is unlocked at or after the unlockable time of the reserved work booth 70, whereby the door of the work booth 70 becomes lockable.

In the first exemplary embodiment, when the user operates the back button 81 while the display example shown in FIG. 14 is being displayed, the CPU 12A changes the display contents of the display 14F to the display contents in the display example shown in FIG. 10.

Furthermore, when the set unlocking time is reached and the process proceeds to step S14 after the determination result obtained in step S13 shown in FIG. 9 indicates "YES", the CPU 12A performs special unlocking on the door of the work booth 70 in step S14.

Accordingly, in the first exemplary embodiment, the door of the reserved work booth 70 may sometimes be unlocked as a result of undergoing special unlocking performed by the cloud server 12, instead of being unlocked with a physical key for unlocking the door of the work booth 70.

In the first exemplary embodiment, the door of each work booth 70 is provided with an electronic lock that is lockable and unlockable in response to a command from the cloud server 12. In the first exemplary embodiment, for example, if the cloud server 12 receives unlocking information input from the portable terminal apparatus 14, the cloud server 12 transmits an unlocking command to the work booth 70, so as to perform normal unlocking on the door of the work booth 70.

In a case where an electronic lock is used in the door of each work booth 70, if the door is unlockable only when the condition "unlocking information is received by the cloud server 12" is satisfied, it is problematic in that the door is not unlockable when the terminal to be used for inputting the unlocking information is not carried, is out of battery, or is undergoing a communication failure. This is because the door of the work booth 70 is locked outside its usage time, and is basically not to be unlocked even at or after the usage start time point unless there is input of unlocking information by the user. Another reason is that each work booth 70 does not have a resident manager near where the work booth 70 is set, and is thus not necessarily in an environment where unlocking of the door is immediately possible.

In the first exemplary embodiment, the CPU 12A of the cloud server 12 performs special unlocking on the door of the reserved work booth 70 between the usage start time point and the usage end time point of the work booth 70 even if there is no input of unlocking information for unlocking the door of the work booth 70. Therefore, the first exemplary embodiment allows an entry to the work booth 70 even when unlocking information for unlocking the door of the work booth 70 is not inputtable.

Specifically, the aforementioned "unlocking information" is to be input by a "user who has made a reservation for a work booth 70 with its door in a locked state and is authorized to unlock the door of the work booth 70 within the usage time according to the reservation". Furthermore, the above expression "even if there is no input of unlocking information" may be translated as "without input of unlocking information". The aforementioned "usage start time point" is specifically a "usage start time point of the reserved time frame (reserved time slot) closest to the current time point with respect to the user who has reserved the work booth 70". In other words, the start time point of all the reserved time slots is the aforementioned "usage start time point". If a time point immediately before the usage start time point of the reserved work booth 70 is in a time frame in which the work booth 70 is reservable, that is, if the work booth 70 is available, the CPU 12A may set a time point, such as 5 minutes or 7 minutes prior to the usage start time point, as the aforementioned "usage start time point". Furthermore, if the same user has reserved two or more consecutive time slots (15 minutes per time slot), the CPU 12A does not set the end time point of each time slot as the aforementioned "usage end time point", but sets the end time point of all the reserved time slots as the aforementioned "usage end time point".

Furthermore, the aforementioned "special unlocking" includes unlocking the door of the work booth 70, as well as unlocking the door of the work booth 70 and opening the door. For example, in a case where the door of the work booth 70 is to be opened by special unlocking, the door may be an automatic door that is openable and closable in response to a command from the cloud server 12. In order to facilitate an entry of the user, the automatic door may be opened to a position where the interior of the work booth 70 is viewable. The door of the work booth 70 may be of any type, such as a hinged door or a sliding door.

In the first exemplary embodiment, the CPU 12A unlocks the door of the work booth 70, that is, receives the setting of an unlocking time for performing special unlocking, at or after the usage start time point of the work booth 70 even if there is no input of unlocking information. Then, the CPU 12A performs special unlocking on the door of the work booth 70 when the received unlocking time is reached. Therefore, the first exemplary embodiment allows an entry to the work booth 70 without input of unlocking information when the unlocking time is reached.

Furthermore, in the first exemplary embodiment, the CPU 12A locks the door of the work booth 70 if a predetermined time has elapsed from when the door of the work booth 70 is unlocked without input of the unlocking information, that is, undergoes special unlocking, upon reaching the unlocking time. The CPU 12A locks the door of the work booth 70 if 5 minutes have elapsed as an example of the predetermined time from when the door of the work booth 70 undergoes special unlocking. Therefore, the first exemplary embodiment may achieve increased security of the work booth 70, as compared with a configuration that maintains the door of the work booth 70 in an unlocked state when the unlocking time is reached. The predetermined time is not limited to 5 minutes, and may be longer or shorter than 5 minutes.

Furthermore, in the first exemplary embodiment, the CPU 12A receives unlocking information at least from a portable terminal that may be carried by the user who is to use the work booth 70. In the first exemplary embodiment, for example, unlocking information is received from the portable terminal apparatus 14, such as a smartphone, carried by the user. Therefore, the first exemplary embodiment allows an entry to the work booth 70 even when a portable terminal is not carried, is out of battery, or is undergoing a communication failure. In place of or in addition to a portable terminal that may be carried by the user who is to use the work booth 70, unlocking information may be inputtable from a terminal carried by a user (referred to as "management user" hereinafter) who is not to use the work booth 70 and who is different from the user intending to use the work booth 70. In this case, the user who is to use the work booth 70 and the management user have to have a certain relationship, such as a superior and a subordinate or members of the same organization.

Furthermore, in the first exemplary embodiment, if information for locking the door of the work booth 70 is input after the door of the work booth 70 is unlocked without input of unlocking information, that is, undergoes special unlocking, the CPU 12A locks the door of the work booth 70. In the first exemplary embodiment, for example, after the door of the work booth 70 undergoes special unlocking, if a locking operation is performed using the lock button 80 displayed on the display 14F of the portable terminal apparatus 14, the CPU 12A locks the door of the work booth 70. Therefore, the first exemplary embodiment may achieve increased security of the work booth 70, as compared with a configuration that maintains the door of the work booth 70 unlocked without input of unlocking information. With this configuration, for example, if the user loses the portable terminal apparatus 14 and subsequently finds the portable terminal apparatus 14 after special unlocking, the door of the work booth 70 is locked, so that an entry of other users into the work booth 70 may be suppressed.

Furthermore, in the first exemplary embodiment, the CPU 12A receives the setting for whether or not the door of the work booth 70 is to be unlocked without input of unlocking information, that is, to undergo special unlocking, at least from the user who is to use the work booth 70. In the first exemplary embodiment, for example, the setting for whether or not special unlocking is to be performed on the door of the work booth 70 is received from the portable terminal apparatus 14, such as a smartphone, carried by the user who is to use the work booth 70 (see FIGS. 10 to 13). Therefore, in the first exemplary embodiment, the setting process for whether or not the door of the work booth 70 is to be unlocked without input of unlocking information may be performed by the user who is to use the work booth 70. Alternatively, the setting process for whether or not special unlocking is to be performed on the door of the work booth 70 may be performed from a terminal carried by the management user in place of or in addition to the portable terminal carried by the user who is to use the work booth 70. In this case, the user who is to use the work booth 70 and the management user have to have a certain relationship, such as a superior and a subordinate or members of the same organization.

If special unlocking is performed on the door of the work booth 70, all users are capable of entering the work booth 70. Therefore, for example, it may be necessary to suppress unauthorized use by users who have not reserved the work booth 70.

In the first exemplary embodiment, when someone is to enter the work booth 70 at or after the usage start time point, the CPU 12A demands input of predetermined authentication information. Then, the CPU 12A permits the use of the work booth 70 if the input authentication information is correct.

Figure 15:
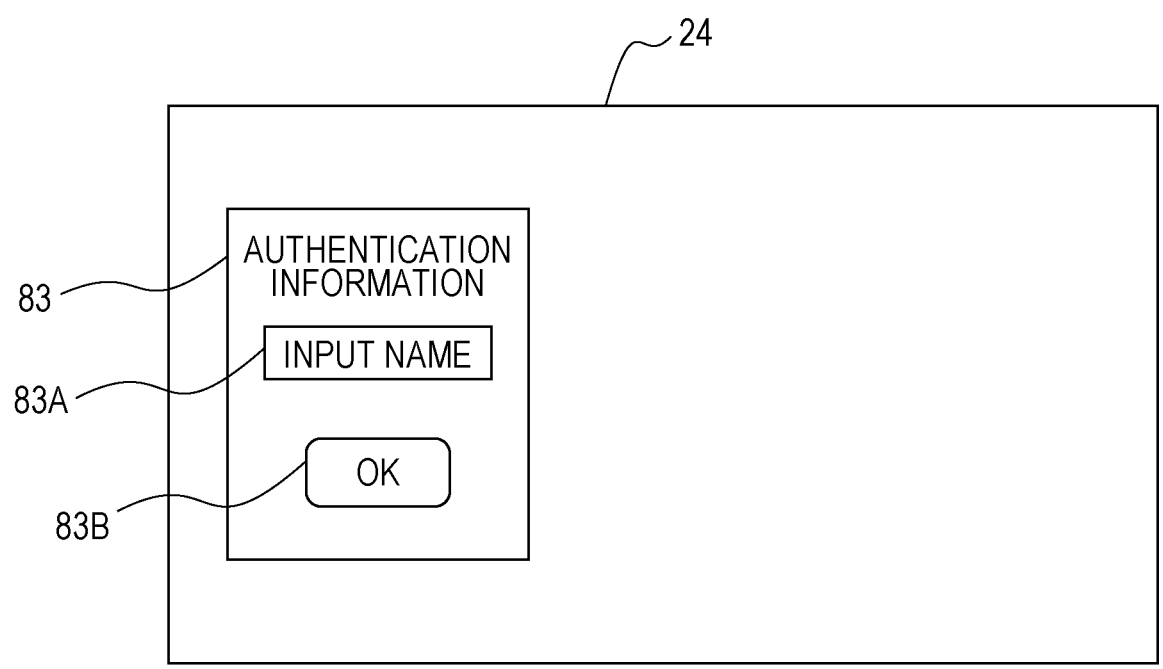
FIG. 15 illustrates a first display example showing an authentication-information input screen.

FIG. 15 illustrates a first display example showing an authentication-information input screen. Specifically, FIG. 15 illustrates a display example of the display 24 of the private room 20. If the CPU 12A of the cloud server 12 receives, via the controller 22 and the communication line 18, detection contents indicating that the detector 42 has detected that the door 21 is open at or after the usage start time point of the reserved private room 20, the CPU 12A causes the display 24 of the private room 20 to display the display example shown in FIG. 15.

The display 24 shown in FIG. 15 displays an authentication-information input section 83. The authentication-information input section 83 includes a name input section 83A and an OK button 83B.

The name input section 83A is where the name of a specific preregistered user is to be input as authentication information. In this case, the "name of a specific user" may be the name of a user who is to use the work booth 70, or may be a user name freely set by a user who has reserved the work booth 70. The input authentication information may be different text other than the name of the specific preregistered user, or may be information other than text. Assumed examples of information other than text include biometric information, such as a fingerprint or an iris, and ownership information, such as an ID card. In other words, authentication using authentication information may be password authentication, biometric authentication, or ownership authentication.

The OK button 83B becomes operable after authentication information is input to the name input section 83A. When the OK button 83B is operated, the controller 22 transmits the input authentication information to the cloud server 12 via the communication line 18. The cloud server 12 compares the received authentication information with preregistered authentication information, and transmits the comparison result to the controller 22 via the communication line 18.

Figure 16:
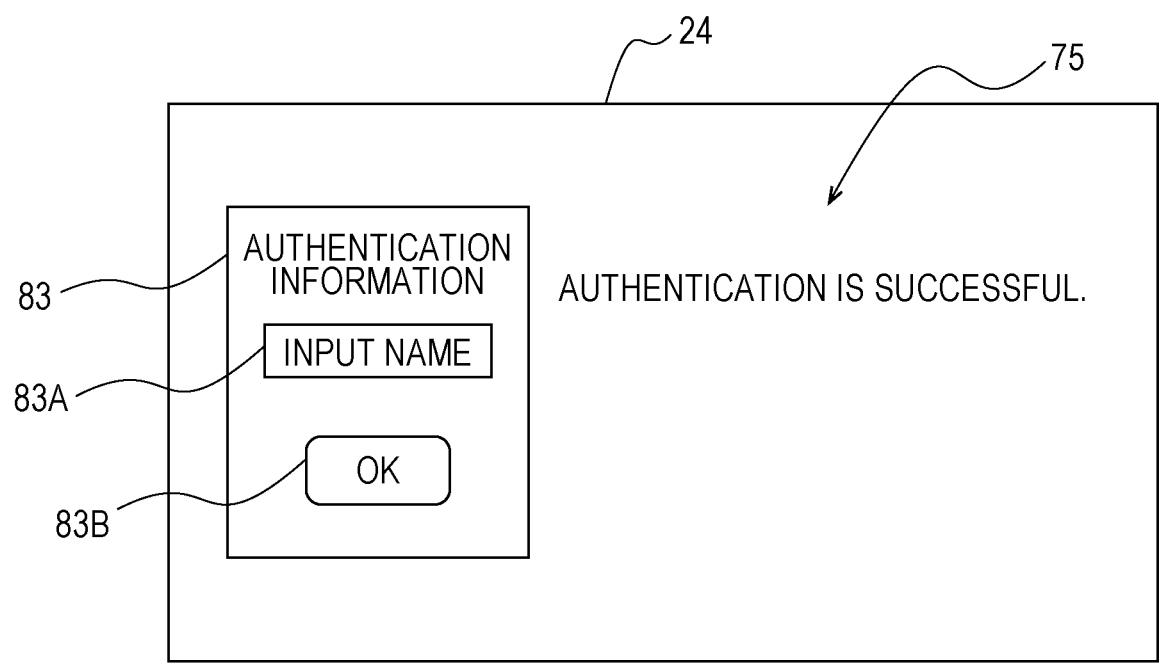
FIG. 16 illustrates a second display example showing the authentication-information input screen.

FIG. 16 illustrates a second display example showing the authentication-information input screen. When the user operates the OK button 83B while the display example shown in FIG. 15 is being displayed, the CPU 12A causes the display 24 to display the display example shown in FIG. 16.

The second display example shown in FIG. 16 displays the message information 75 to the right of the authentication-information input section 83, in addition to the first display example shown in FIG. 15. For example, the message information 75 displayed in FIG. 16 reads "AUTHENTICATION IS SUCCESSFUL.".

In other words, the second display example shown in FIG. 16 corresponds to a case where the input authentication information is correct. In this case, after a predetermined time has elapsed from when the second display example shown in FIG. 16 is displayed, the CPU 12A changes the display contents of the display 24 to predetermined display contents. A case where the input authentication information is correct corresponds to a case where the comparison result indicates that the input authentication information matches the preregistered authentication information.

In contrast, in the first exemplary embodiment, in a case where the input authentication information is not correct, the CPU 12A prohibits the use of the work booth 70. Then, the CPU 12A provides a notification for urging a reservation of the work booth 70 and a notification for guidance to another available work booth 70 other than the relevant work booth 70. A case where the input authentication information is not correct corresponds to a case where the comparison result indicates that the input authentication information does not match the preregistered authentication information.

Figure 17:
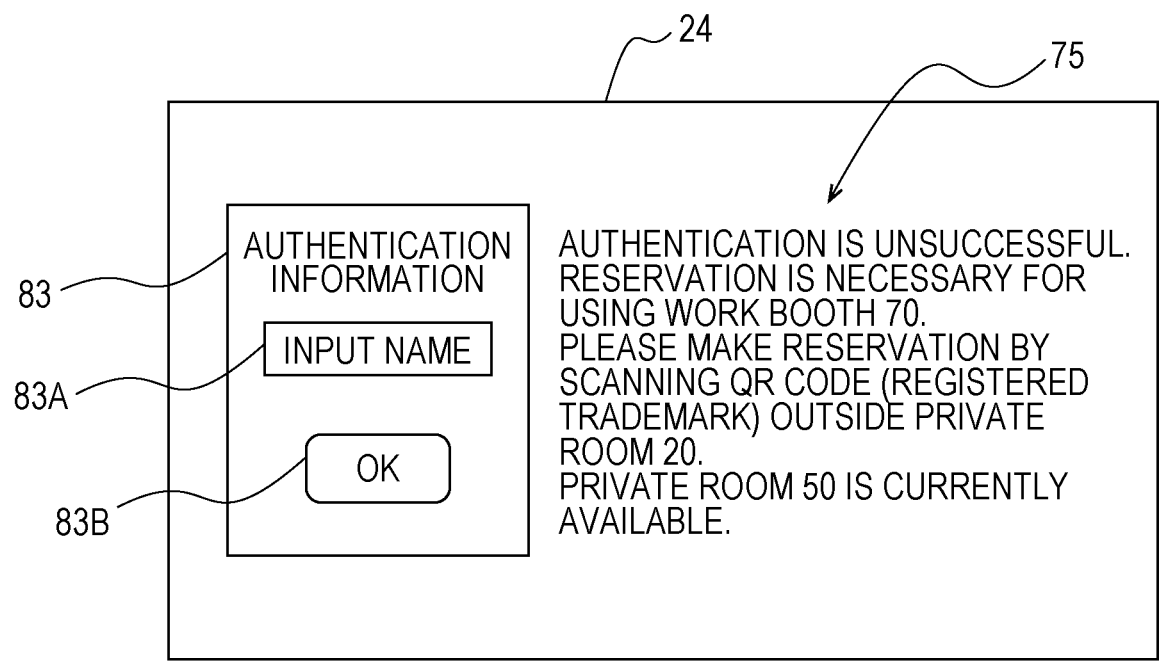
FIG. 17 illustrates a third display example showing the authentication-information input screen.

FIG. 17 illustrates a third display example showing the authentication-information input screen. When the user operates the OK button 83B while the display example shown in FIG. 15 is being displayed, the CPU 12A causes the display 24 to display the display example shown in FIG. 17.

The third display example shown in FIG. 17 displays the message information 75 to the right of the authentication-information input section 83, in addition to the first display example shown in FIG. 15. For example, the message information 75 displayed in FIG. 17 reads "AUTHENTICATION IS UNSUCCESSFUL. RESERVATION IS NECESSARY FOR USING WORK BOOTH 70. PLEASE MAKE RESERVATION BY SCANNING QR CODE (REGISTERED TRADEMARK) OUTSIDE PRIVATE ROOM 20. PRIVATE ROOM 50 IS CURRENTLY AVAILABLE.".

In other words, the third display example shown in FIG. 17 corresponds to a case where the input authentication information is not correct. Then, in this case, in order to prohibit the use of the private room 20, the controller 22 cuts off the supply of electric power to the power and USB outlet 30 and devices, such as the air conditioner 34, excluding the notifier 44 including the display 24, based on a command from the CPU 12A. In contrast, if the use of the private room 20 is permitted, the controller 22 supplies electric power to the power and USB outlet 30 and devices, such as the air conditioner 34, based on a command from the CPU 12A.

According to the above configuration, the first exemplary embodiment may suppress unauthorized use of the work booth 70, as compared with a configuration that allows the work booth 70 to be usable without input of authentication information at or after the usage start time point.

Furthermore, in the first exemplary embodiment, the CPU 12A causes the display 24 to display the message information 75 (see FIG. 17) including the notification for urging a reservation of the work booth 70, so that the user may be informed that a reservation of the work booth 70 is necessary. Moreover, in the first exemplary embodiment, the CPU 12A causes the display 24 to display the message information 75 (see FIG. 17) including the notification for guidance to another available work booth 70 other than the relevant work booth 70, so that the user may be informed of the available work booth 70.

In place of or in addition to the display equipped in each work booth 70, the CPU 12A may use a loudspeaker and a lamp equipped in the work booth 70 to output sound and light, so as to provide the notification for urging a reservation of the work booth 70 and the notification for guidance to another available work booth 70 other than the relevant work booth 70.

The display 24 of the private room 20 displaying the authentication-information input screen may be configured to display various types of information inside the private room 20, or may be configured to display various types of information outside the private room 20. Specifically, the user may be made to input authentication information either before or after the user enters the private room 20. Moreover, the user may input the authentication information as text by operating the display equipped in the work booth 70, or as sound by using a microphone provided in the work booth 70. In other words, the input method is not limited.

Furthermore, if the input authentication information is not correct, the CPU 12A may alternatively provide either one of the notification for urging a reservation of the work booth 70 and the notification for guidance to another available work booth 70 other than the relevant work booth 70, instead of providing both notifications.

Second Exemplary Embodiment

Next, a second exemplary embodiment will be described while omitting or simplifying sections redundant with other exemplary embodiments.

Figure 18:
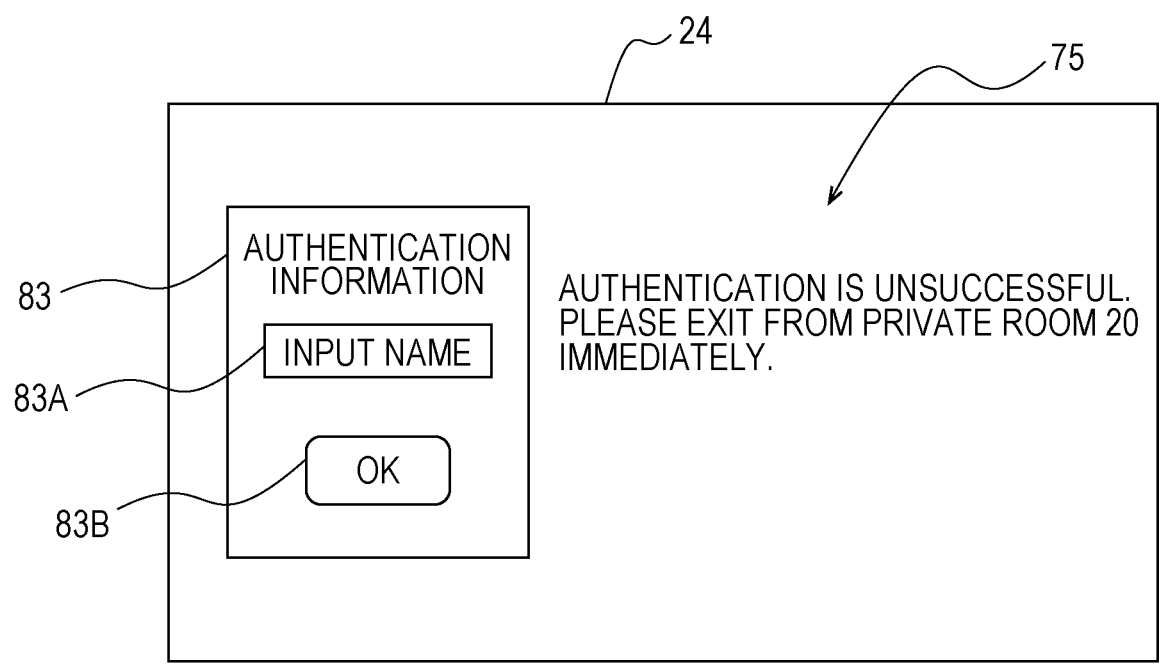
FIG. 18 illustrates a fourth display example showing the authentication-information input screen.

FIG. 18 illustrates a fourth display example showing the authentication-information input screen. When the user operates the OK button 83B while the display example shown in FIG. 15 is being displayed, the CPU 12A causes the display 24 to display the display example shown in FIG. 18.

The fourth display example shown in FIG. 18 displays the message information 75 to the right of the authentication-information input section 83, in addition to the first display example shown in FIG. 15. For example, the message information 75 displayed in FIG. 18 reads "AUTHENTICATION IS UNSUCCESSFUL. PLEASE EXIT FROM PRIVATE ROOM 20 IMMEDIATELY.".

Specifically, the fourth display example shown in FIG. 18 corresponds to a case where the input authentication information is not correct. Then, in this case, similar to the first exemplary embodiment, in order to prohibit the use of the private room 20, the controller 22 cuts off the supply of electric power to the power and USB outlet 30 and devices, such as the air conditioner 34, excluding the notifier 44 including the display 24, based on a command from the CPU 12A.

Accordingly, in the second exemplary embodiment, the CPU 12A prohibits the use of the work booth 70 if the input authentication information is not correct. Then, the CPU 12A provides a notification for urging an exit from the work booth 70. Therefore, in the second exemplary embodiment, the user may be informed that the work booth 70 is not available.

In place of or in addition to the display equipped in the work booth 70, the CPU 12A may use a loudspeaker and a lamp equipped in the work booth 70 to output sound and light, so as to provide the notification for urging an exit from the work booth 70.

Third Exemplary Embodiment

Next, a third exemplary embodiment will be described while omitting or simplifying sections redundant with other exemplary embodiments.

When special unlocking is performed on the door of the work booth 70, the user may enter the work booth 70 at or after the usage start time point, and there is a high possibility that the usage time may be shorter than the original usable time unless the usage time is extended.

In the third exemplary embodiment, when the CPU 12A confirms an entry to the work booth 70 at or after the usage start time point, the CPU 12A extends the predetermined usage end time point by a delay time determined based on the time point at which the user has entered the work booth 70. In detail, of the available time frames of the work booth 70, the CPU 12A receives designation of a freely-chosen time frame from the reservable time frames of the work booth 70 (see FIG. 7). If a reservable time frame of the work booth 70 is immediately after the received freely-chosen time frame, the CPU 12A extends the predetermined usage end time point by the delay time.

This will be described in detail below with reference to FIGS. 19 and 20.

Figure 19:
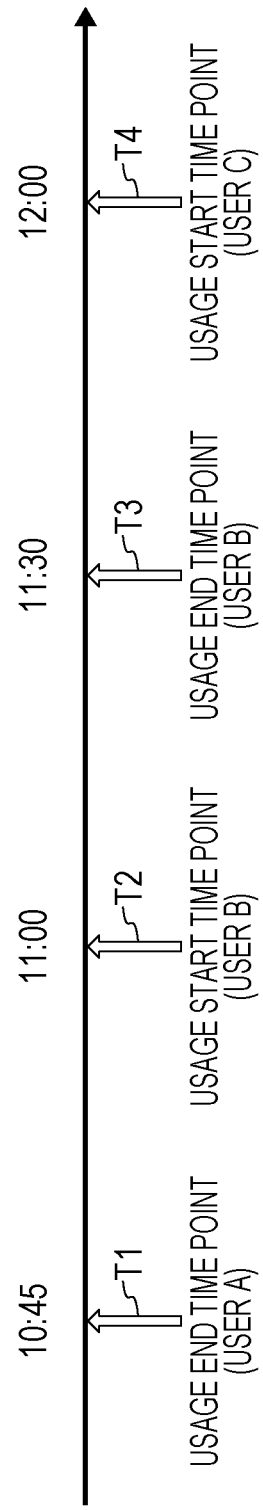
FIG. 19 is a first timing chart showing the reservation status of a specific work booth.

FIG. 19 is a first timing chart showing the reservation status of a specific work booth 70 (e.g., private room 20). A timing T1 shown in FIG. 19 indicates a usage end time point of the private room 20 for a user A, a timing T2 indicates a usage start time point of the private room 20 for a user B, a timing T3 indicates a usage end time point of the private room 20 for the user B, and a timing T4 indicates a usage start time point of the private room 20 for a user C.

In detail, the usage end time point of the private room 20 for the user A shown in FIG. 19 is "10:45", the usage start time point of the private room 20 for the user B is "11:00", the usage end time point of the private room 20 for the user B is "11:30", and the usage start time point of the private room 20 for the user C is "12:00".

Specifically, the user B plans to use the private room 20 for 30 minutes 15 minutes after the usage end time point of the private room 20 for the user A. The user C plans to use the private room 20 30 minutes after the usage end time point of the private room 20 for the user B.

Figure 20:
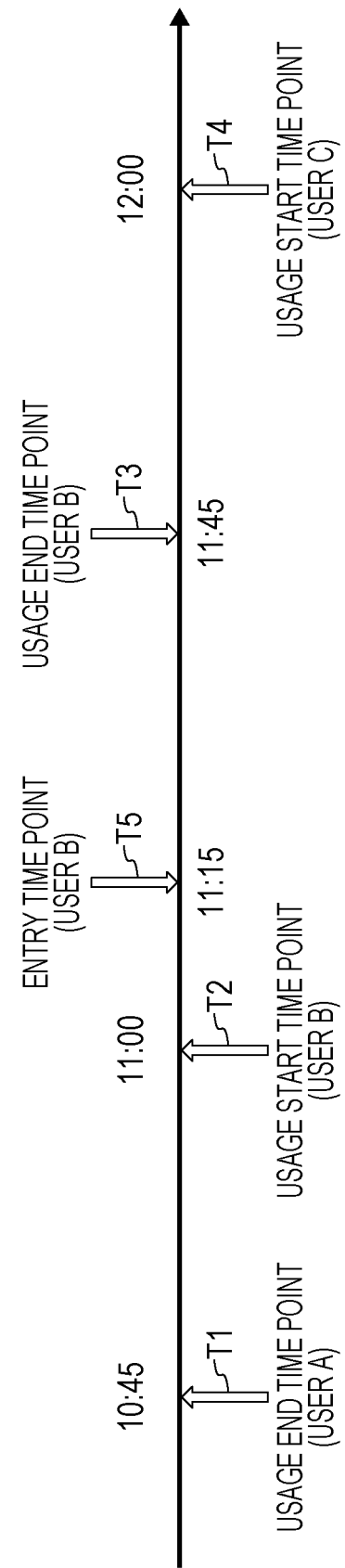
FIG. 20 is a second timing chart showing the reservation status of a specific work booth.

FIG. 20 is a second timing chart showing the reservation status of a specific work booth 70 (e.g., private room 20).

The second timing chart shown in FIG. 20 displays a timing T5 indicating an entry time point at which the user B enters the private room 20, in addition to the first timing chart shown in FIG. 19. As shown in FIG. 20, the entry time point at which the user B enters the private room 20 is "11:15", which is after the timing T2 indicating the usage start time point of the private room 20 for the user B. The CPU 12A sets the time point at which the CPU 12A receives the detection contents indicating the detection of a person in the private room 20 by the detector 42 via the controller 22 and the communication line 18 as the "entry time point". Moreover, the CPU 12A determines that the "entry to the work booth 70 is confirmed" when the CPU 12A receives the detection contents indicating the detection of a person in the private room 20 by the detector 42 via the controller 22 and the communication line 18.

Furthermore, in the second timing chart shown in FIG. 20, the usage end time point of the private room 20 for the user B is extended from "11:30" to "11:45" in the first timing chart shown in FIG. 19 (see the timing T3 in FIGS. 19 and 20). This is because the time frame immediately after the reserved time frame of the private room 20 by the user B is a reservable time frame of the private room 20. In other words, because the 30 minute period after the original usage end time point of the private room 20 for the user B is a reservable time frame of the private room 20 (see FIGS. 7 and 19), the CPU 12A extends the usage end time point by 15 minutes corresponding to the delay time of the user B, so as to change the usage end time point to a new usage end time point of "11:45". The original usage end time point is an example of a "predetermined usage end time point".

According to the above configuration, in the third exemplary embodiment, the usage time of the work booth 70 may be extended, as compared with a configuration that maintains the predetermined usage end time point when an entry to the work booth 70 is confirmed at or after the usage start time point. Furthermore, in the third exemplary embodiment, it is determined whether or not the usage end time point is to be extended in accordance with the availability of a time frame immediately after the predetermined usage end time point of the work booth 70. If the usage end time point is extended, the extended time may be subject to a usage fee, or may be free.

Furthermore, in the third exemplary embodiment, if the CPU 12A extends the predetermined usage end time point of the work booth 70, that is, the original usage end time point, by the aforementioned delay time, the CPU 12A provides a notification about the extension.

Figure 21:
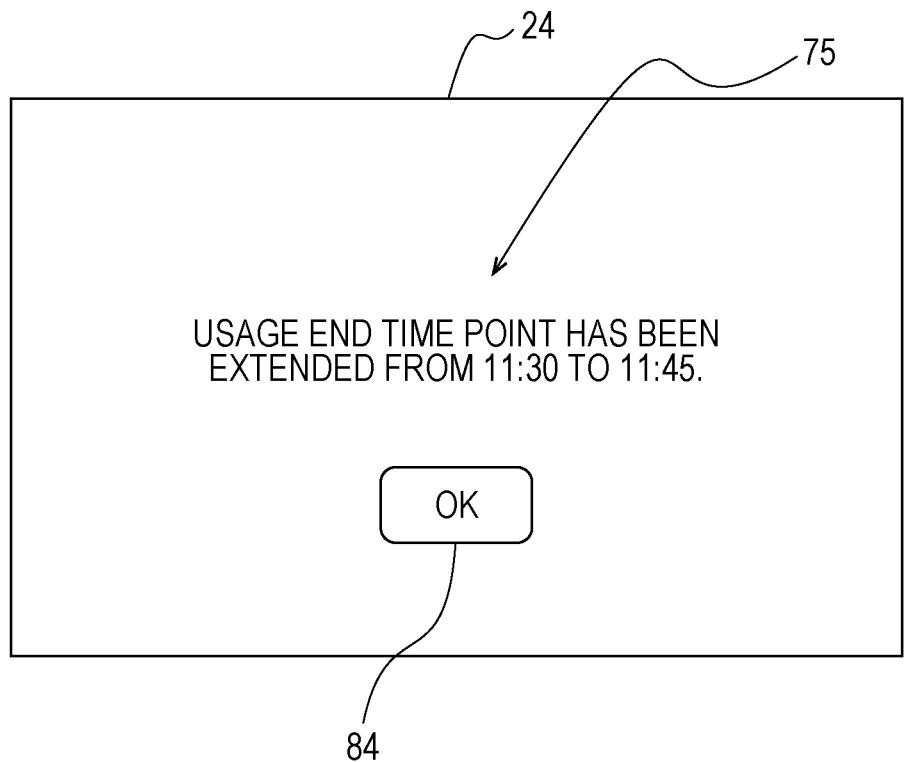
FIG. 21 illustrates a display example indicating that an original usage end time point has been extended by a delay time.

FIG. 21 illustrates a display example indicating that the original usage end time point has been extended by the aforementioned delay time. The CPU 12A causes the display 24 to display the display example shown in FIG. 21 in a case where the original usage end time point of the private room 20 has been extended by the aforementioned delay time.

The display 24 shown in FIG. 21 displays the message information 75 and an OK button 84. For example, the message information 75 displayed in FIG. 21 reads "USAGE END TIME POINT HAS BEEN EXTENDED FROM 11:30 TO 11:45.". In the third exemplary embodiment, when the user operates the OK button 84 while the display example shown in FIG. 21 is being displayed, the CPU 12A changes the display contents of the display 24 to predetermined display contents.

According to the above configuration, in the third exemplary embodiment, the user may be informed that the predetermined usage end time point of the work booth 70 has been extended.

In place of or in addition to the display 24, the CPU 12A may cause a display of a user terminal (e.g., the portable terminal apparatus 14 of the user who is to use the work booth 70) carried by the user who has reserved the work booth 70 to display the display example.

Furthermore, instead of or in addition to providing the notification about the fact that the original usage end time point has been extended by the aforementioned delay time by displaying the notification on the display equipped in the work booth 70 and the display equipped in the user terminal carried by the user who has reserved the work booth 70, the notification may be provided in the form of sound or light output by using a loudspeaker or a lamp equipped in each of the work booth 70 and the user terminal.

Furthermore, in the third exemplary embodiment, the extension time by which the predetermined usage end time point of the work booth 70 is to be extended may be shorter than the delay time of the entry to the work booth 70. For example, even when the delay time is "30 minutes", if there is no reservable time frame of "30 minutes" after the reserved time frame of the work booth 70 by the tardy user, the CPU 12A may sometimes set the extension time to "15 minutes". Specifically, the aforementioned "delay time" is set in accordance with the availability in the reservation status after the reserved time frame of the work booth 70 by the tardy user.

Fourth Exemplary Embodiment

Next, a fourth exemplary embodiment will be described while omitting or simplifying sections redundant with other exemplary embodiments.

In a case where an electronic lock is used in the door of a work booth 70, if the door is unlockable only when the condition "unlocking information is received by the cloud server 12" is satisfied, it is problematic in that the door is not unlockable when the terminal to be used for inputting the unlocking information is not carried, is out of battery, or is undergoing a communication failure.

The aforementioned problem may similarly occur when the user enters the work booth 70 and then temporarily exits from the work booth 70 for an errand.

In the fourth exemplary embodiment, in a case where the CPU 12A confirms that the user has entered the work booth 70 and subsequently confirms that the user has exited from the work booth 70 before the usage end time point, the CPU 12A performs unlocking, that is, special unlocking, on the door of the work booth 70 between the time point at which the exit is confirmed and the usage end time point even if there is no input of unlocking information. After confirming the entry to the work booth 70, the CPU 12A determines that the "the exit from the work booth 70 is confirmed" if the CPU 12A receives detection contents indicating that the detector 42 has detected that the door 21 is open via the controller 22 and the communication line 18 before the usage end time point.

Then, in the fourth exemplary embodiment, the CPU 12A receives a setting for whether or not special unlocking is to be performed on the door of the work booth 70 in the above-described case at least from the user using the work booth 70.

Figure 22:
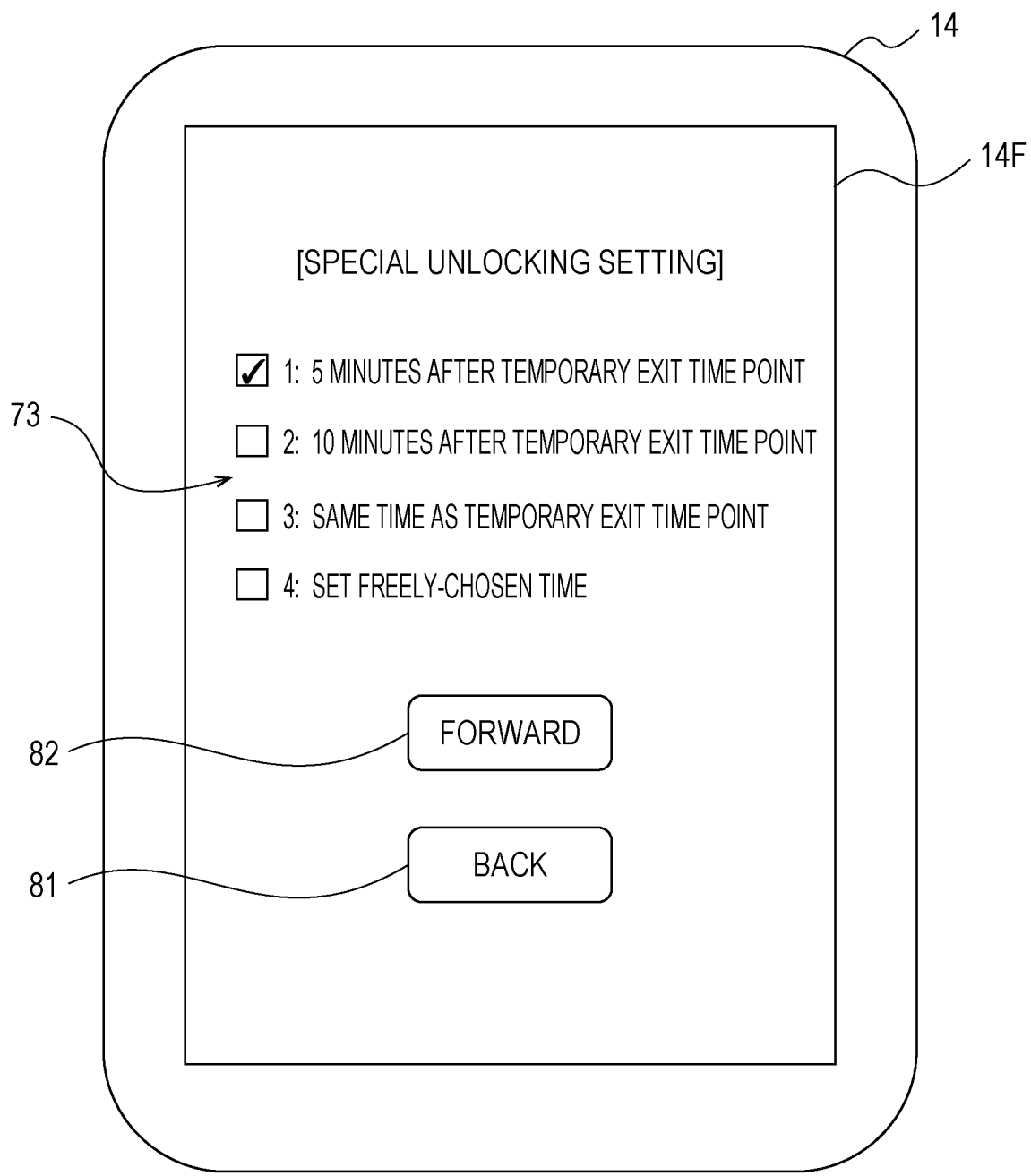
FIG. 22 illustrates a display example after an OK button is operated.

FIG. 22 illustrates a display example after the OK button 76 (see FIG. 13) is operated. When the user operates the OK button 76 while the display example shown in FIG. 13 is being displayed, the CPU 12A causes the display 14F to display the display example shown in FIG. 22.

The display 14F shown in FIG. 22 displays the candidate information 73, the forward button 82, and the back button 81.

For example, the candidate information 73 displayed in FIG. 22 includes multiple unlocking-time candidates for performing special unlocking on the door of the reserved work booth 70 at or after a temporary exit time point of the work booth 70. Moreover, in FIG. 22, for example, a checkmark is given to a checkbox for "1: 5 MINUTES AFTER TEMPORARY EXIT TIME POINT" among the multiple unlocking-time candidates.

Figure 23:
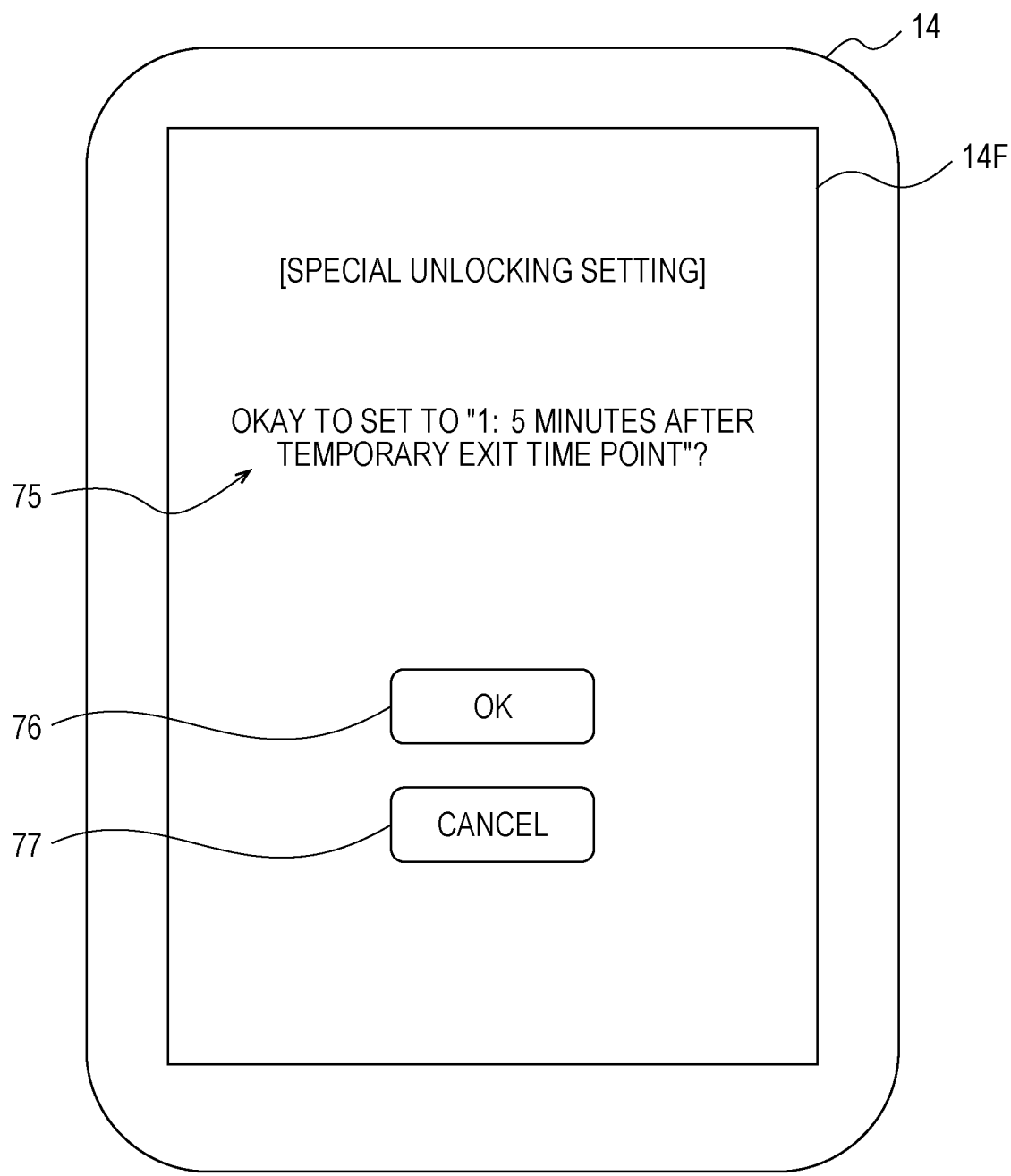
FIG. 23 illustrates a third display example after the forward button is operated.

In the fourth exemplary embodiment, when the user operates the forward button 82 after giving a checkmark to any of the checkboxes in the candidate information 73 shown in FIG. 22, the CPU 12A changes the display contents of the display 14F to display contents in a display example shown in FIG. 23. In contrast, in the fourth exemplary embodiment, when the user operates the back button 81 while the display example shown in FIG. 22 is being displayed, the CPU 12A changes the display contents of the display 14F to the display contents in the display example shown in FIG. 10.

FIG. 23 illustrates a third display example after the forward button 82 is operated. The display 14F shown in FIG. 23 displays the message information 75, the OK button 76, and the cancel button 77. For example, the message information 75 displayed in FIG. 23 reads "[SPECIAL UNLOCKING SETTING] OKAY TO SET TO "1: 5 MINUTES AFTER TEMPORARY EXIT TIME POINT"?". In the fourth exemplary embodiment, when the user operates the OK button 76 while the display example shown in FIG. 23 is being displayed, the CPU 12A completes the special unlocking setting process and sets a special unlocking mode to the door of the reserved work booth 70. In contrast, in the fourth exemplary embodiment, when the user operates the cancel button 77 while the display example shown in FIG. 23 is being displayed, the CPU 12A aborts the special unlocking setting process and changes the display 14F to predetermined display contents.

According to the above configuration, in the fourth exemplary embodiment, the user may enter the work booth 70 without inputting unlocking information when the user temporarily exits from the work booth 70 before the usage end time point.

Fifth Exemplary Embodiment

Next, a fifth exemplary embodiment will be described while omitting or simplifying sections redundant with other exemplary embodiments.

In the fifth exemplary embodiment, the CPU 12A provides a notification about reservation information related to a reservation of a reserved work booth 70 if an entry to the work booth 70 is not confirmable within a predetermined time from the usage start time point according to the reservation of the work booth 70.

Figure 24:
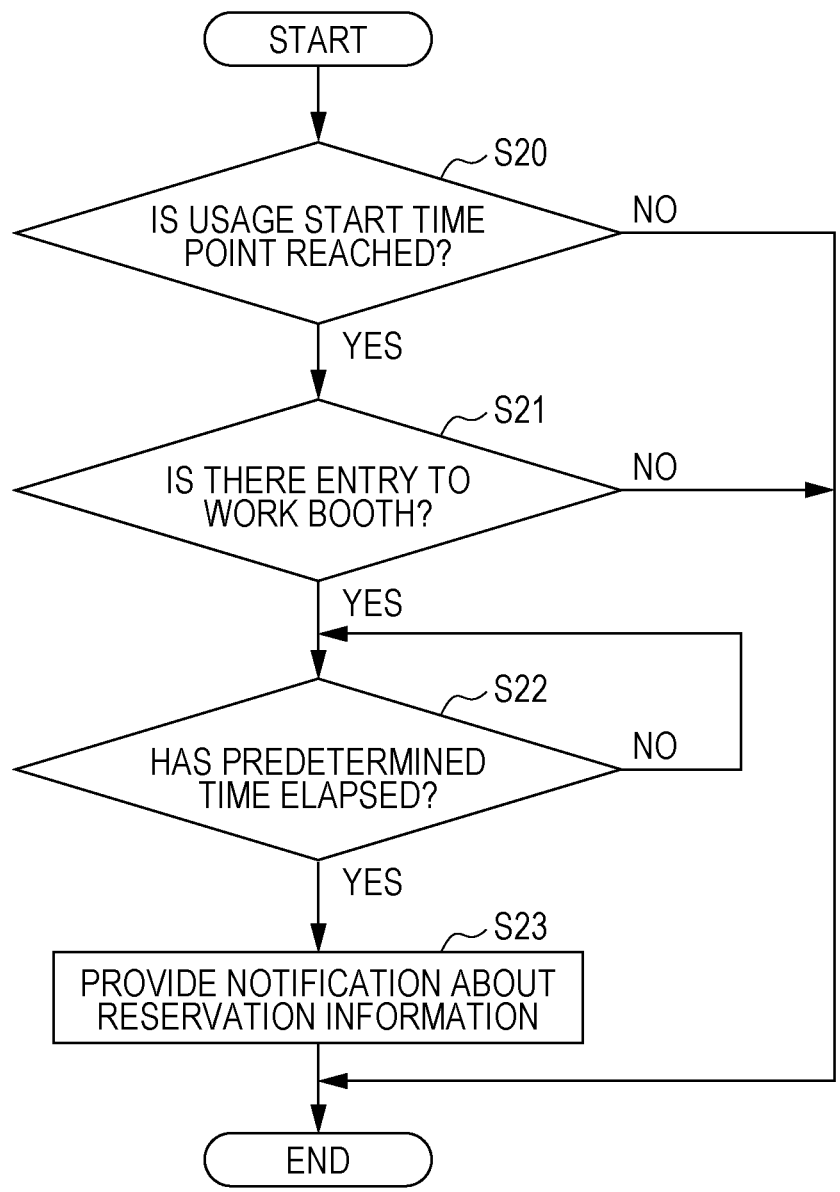
FIG. 24 is a flowchart illustrating the flow of a notification process.

FIG. 24 is a flowchart illustrating the flow of a notification process for providing a notification about the reservation information related to the reservation of the work booth 70. The CPU 12A reads an information processing program from the ROM 12B or the storage unit 12D, loads the information processing program in the RAM 12C, and executes the information processing program, whereby the notification process is performed by the cloud server 12. The following description relates to a case where the private room 20 is the reserved work booth 70.

In step S20 shown in FIG. 24, the CPU 12A determines whether or not the usage start time point of the reserved private room 20 is reached. If the CPU 12A determines that the usage start time point of the reserved private room 20 is reached (YES in step S20), the process proceeds to step S21. In contrast, if the CPU 12A determines that the usage start time point of the reserved private room 20 is not reached (NO in step S20), the process ends.

In step S21, the CPU 12A determines whether or not there is an entry to the reserved private room 20. If the CPU 12A determines that there is no entry to the private room 20 (YES in step S21), the process proceeds to step S22. In contrast, if the CPU 12A determines that there is an entry to the private room 20 (NO in step S21), the process ends. The CPU 12A determines that "there is an entry to the private room 20" if the CPU 12A receives the detection contents indicating the detection of a person in the private room 20 by the detector 42 via the controller 22 and the communication line 18, and determines that "there is no entry to the private room 20" if the CPU 12A does not receive the detection contents.

In step S22, the CPU 12A determines whether or not a predetermined time has elapsed from the usage start time point of the reserved private room 20. If the CPU 12A determines that the predetermined time has elapsed (YES in step S22), the process proceeds to step S23. In contrast, if the CPU 12A determines that the predetermined time has not elapsed (NO in step S22), step S22 is performed again. The "predetermined time" in step S22 is a freely-set time having a lower limit of "0 seconds" and an upper limit of "the usage end time point of the private room 20". For example, if the predetermined time is set to "0 seconds", the CPU 12A determines in step S22 that the predetermined time has elapsed at the same time as when the usage start time point of the reserved private room 20 is reached. If the predetermined time is set to "5 minutes", the CPU 12A determines in step S22 that the predetermined time has elapsed 5 minutes after the usage start time point of the reserved private room 20. The predetermined time may be selected from multiple presented candidates, such as "0 seconds", "5 minutes", and "7 minutes", or may be freely designated by the user.

In step S23, the CPU 12A provides a notification about the reservation information. Then, the process ends.

For example, the CPU 12A provides the notification about the reservation information to the user terminal carried by the user who has reserved the work booth 70. The following description relates to an example where the private room 20 is the work booth 70, and the notification about the reservation information is provided to the portable terminal apparatus 14, such as a smartphone, carried by the user who is to use the private room 20.

Figure 25:
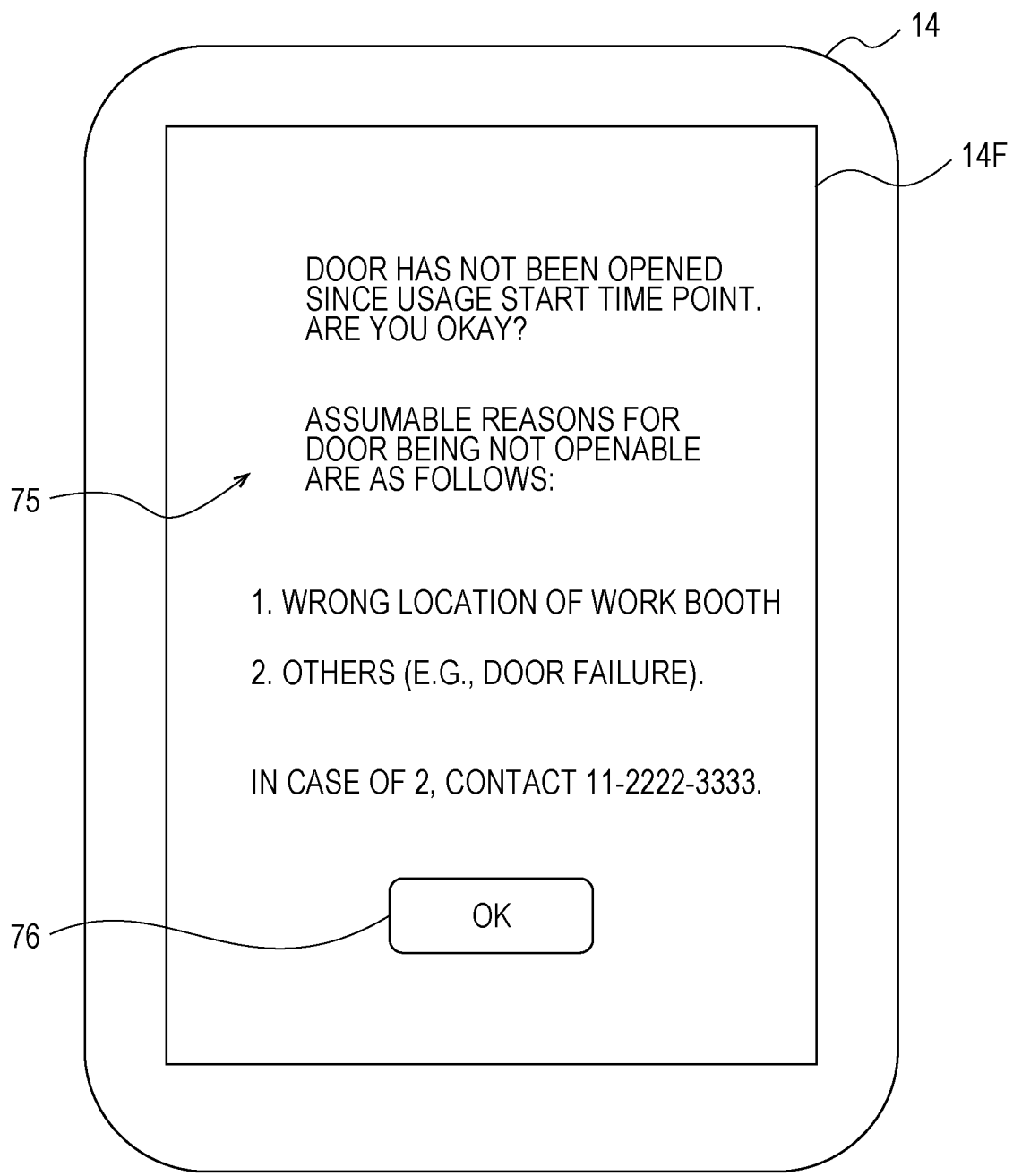
FIG. 25 illustrates a first display example showing reservation information.

FIG. 25 illustrates a first display example showing the reservation information. The CPU 12A of the cloud server 12 causes the display 14F of the portable terminal apparatus 14 to display the display example shown in FIG. 25 if an entry to the private room 20 is not confirmable before a lapse of the predetermined time from the usage start time point according to the reservation of the reserved private room 20.

The display 14F shown in FIG. 25 displays the message information 75 and the OK button 76 as the reservation information.

For example, the message information 75 displayed in FIG. 25 reads "DOOR HAS NOT BEEN OPENED SINCE USAGE START TIME POINT. ARE YOU OKAY? ASSUMABLE REASONS FOR DOOR BEING NOT OPENABLE ARE AS FOLLOWS: 1. WRONG LOCATION OF WORK BOOTH, 2. OTHERS (E.G., DOOR FAILURE). IN CASE OF 2, CONTACT 11-2222-3333.".

In the fifth exemplary embodiment, when the user operates the OK button 76 while the display example shown in FIG. 25 is being displayed, the CPU 12A changes the display 14F to predetermined display contents.

In the related art, there is a service that may be reserved by designating the time and date in advance and becomes usable when the reserved time frame is reached. For example, in a case where the aforementioned work booth 70 is to be provided as the service, if there are many other work booths 70 around the reserved work booth 70, it is assumable that the user may mistakenly arrive at a work booth 70 different from the reserved work booth 70 and is thus not able to use the work booth 70 even when the usage start time point is reached. For example, if there are multiple work booths 70 at the same station, it is assumable that an inexperienced user may arrive at a wrong work booth 70.

In the fifth exemplary embodiment, the CPU 12A provides a notification about the reservation information to the user terminal if an entry to the work booth 70 is not confirmable before a lapse of the predetermined time from the usage start time point according to the reservation of the reserved work booth 70. Therefore, according to the fifth exemplary embodiment, the user may recognize that an entry to the reserved work booth 70 has not been made within the reserved time. Accordingly, the user who is to use the work booth 70 may recognize that the user is currently at the wrong location (e.g., has arrived at a wrong work booth 70), and may take measures, such as checking the location of the reserved work booth 70.

Furthermore, in the fifth exemplary embodiment, the CPU 12A provides the notification about the reservation information in a case where detection is not performed by a detector, provided in at least one of the door of the work booth 70 and the interior of the work booth 70, before a lapse of the predetermined time from the usage start time point of the work booth 70, as a case where an entry to the reserved work booth 70 is not confirmable. For example, in a case where the private room 20 is set as the work booth 70, the CPU 12A provides the notification about the reservation information to the user terminal if the detector 42 does not perform at least one of an opening detection process of the door 21 and a human detection process in the private room 20 before a lapse of 5 minutes as an example of the predetermined time from the usage start time point of the private room 20. Therefore, in the fifth exemplary embodiment, it is possible to confirm whether or not an entry to the work booth 70 is made based on detection by a detector provided in at least one of the door of the work booth 70 and the interior of the work booth 70. Alternatively or additionally, when the private room 20 is set as the work booth 70, the CPU 12A may provide the notification about the reservation information to the user terminal if the door 21 is not unlocked by the door locking device 40 before a lapse of 5 minutes as an example of the predetermined time from the usage start time point of the private room 20. As another alternative, in a situation where a work booth 70 located at the shortest distance from the current location of the portable terminal apparatus 14 is not the reserved work booth 70, if unlocking information for a work booth 70 reserved from the current location is input, the CPU 12A may provide the notification about the reservation information as a case where an entry to the reserved work booth 70 is not confirmable.

The display contents of the reservation information are not limited to the display example shown in FIG. 25 and may be other display contents. The following description relates to an example where display contents different from the display example shown in FIG. 25 are displayed as the reservation information. Similar to the above description, the following description relates to an example where the private room 20 is set as the work booth 70 and the notification about the reservation information is provided to the portable terminal apparatus 14.

Figure 26:
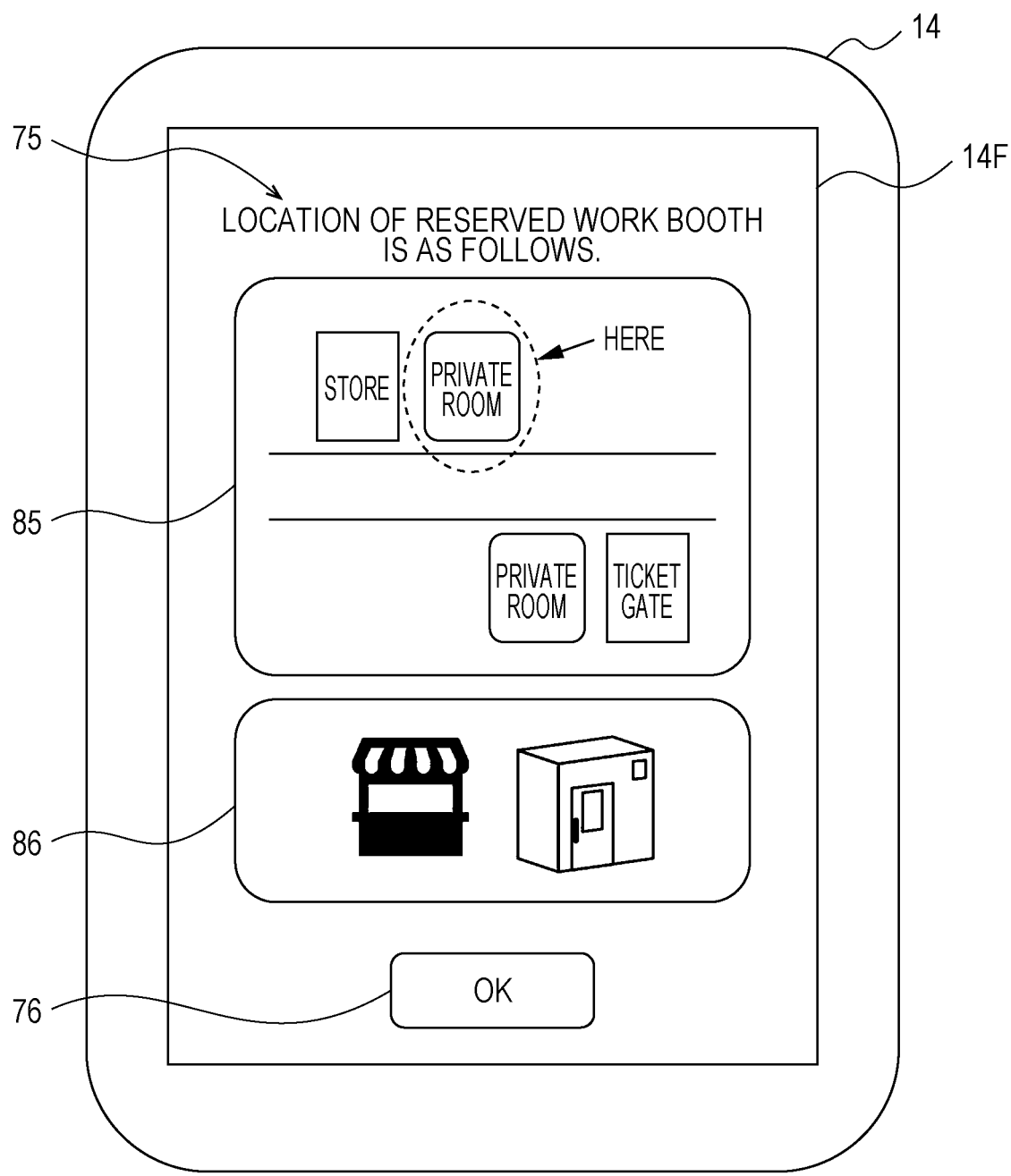
FIG. 26 illustrates a second display example showing the reservation information.

FIG. 26 illustrates a second display example showing the reservation information. The CPU 12A causes the display 14F to display the display example shown in FIG. 26 if an entry to the private room 20 is not confirmable before a lapse of the predetermined time from the usage start time point according to the reservation of the reserved private room 20.

The display 14F shown in FIG. 26 displays the message information 75, map information 85, image information 86, and the OK button 76 as the reservation information.

For example, the message information 75 displayed in FIG. 26 reads "LOCATION OF RESERVED WORK BOOTH IS AS FOLLOWS.".

The map information 85 indicates, to the user, the location of the reserved work booth 70 on a map. For example, the map information 85 displayed in FIG. 26 indicates the locations of multiple private rooms and the locations of landmarks (such as a store and a ticket gate) adjacent to the individual private rooms on the map. In FIG. 26, the location of the reserved work booth 70 (e.g., the private room 20) is indicated by surrounding the work booth 70 with a dashed circle.

The image information 86 indicates the external appearances of the reserved work booth 70 and a landmark adjacent to the work booth 70 to the user by using images. For example, the image information 86 displayed in FIG. 26 includes the external appearance of the reserved work booth 70 (e.g., the private room 20) and the external appearance of a "store" as the landmark adjacent to the work booth 70. In FIG. 26, the external appearance of the store is displayed to the left of the external appearance of the work booth 70 in the image information 86 in correspondence with the locations of the work booth 70 and the store on the map of the map information 85.

In the fifth exemplary embodiment, when the user operates the OK button 76 while the display example shown in FIG. 26 is being displayed, the CPU 12A changes the display 14F to predetermined display contents.

Accordingly, the CPU 12A may provide a notification about information for guiding the user who has reserved the work booth 70 to the work booth 70 as the reservation information. According to this configuration, in the fifth exemplary embodiment, the user may be informed of the guidance information to the reserved work booth 70. Accordingly, the user who is to use the work booth 70 may take measures, such as moving to the work booth 70 while checking the provided reservation information.

In addition to providing the notification about the reservation information to the user terminal, the CPU 12A may provide the notification about the reservation information by using a notifier constituted of a display, a loudspeaker, and a lamp equipped in the work booth 70. The following description relates to an example where the portable terminal apparatus 14 is the user terminal to be provided with the notification about the reservation information, and the private room 20 is the work booth 70. The private room 20 is the work booth 70 reserved by the user.

In a case where the CPU 12A is to provide the notification about the reservation information to the portable terminal apparatus 14 and the notifier 44 equipped in the private room 20, the CPU 12A switches between the notification about the reservation information to be provided to the portable terminal apparatus 14 and the notification about the reservation information to be provided to the notifier 44 in accordance with acquired positional information of the portable terminal apparatus 14.

Figure 27:
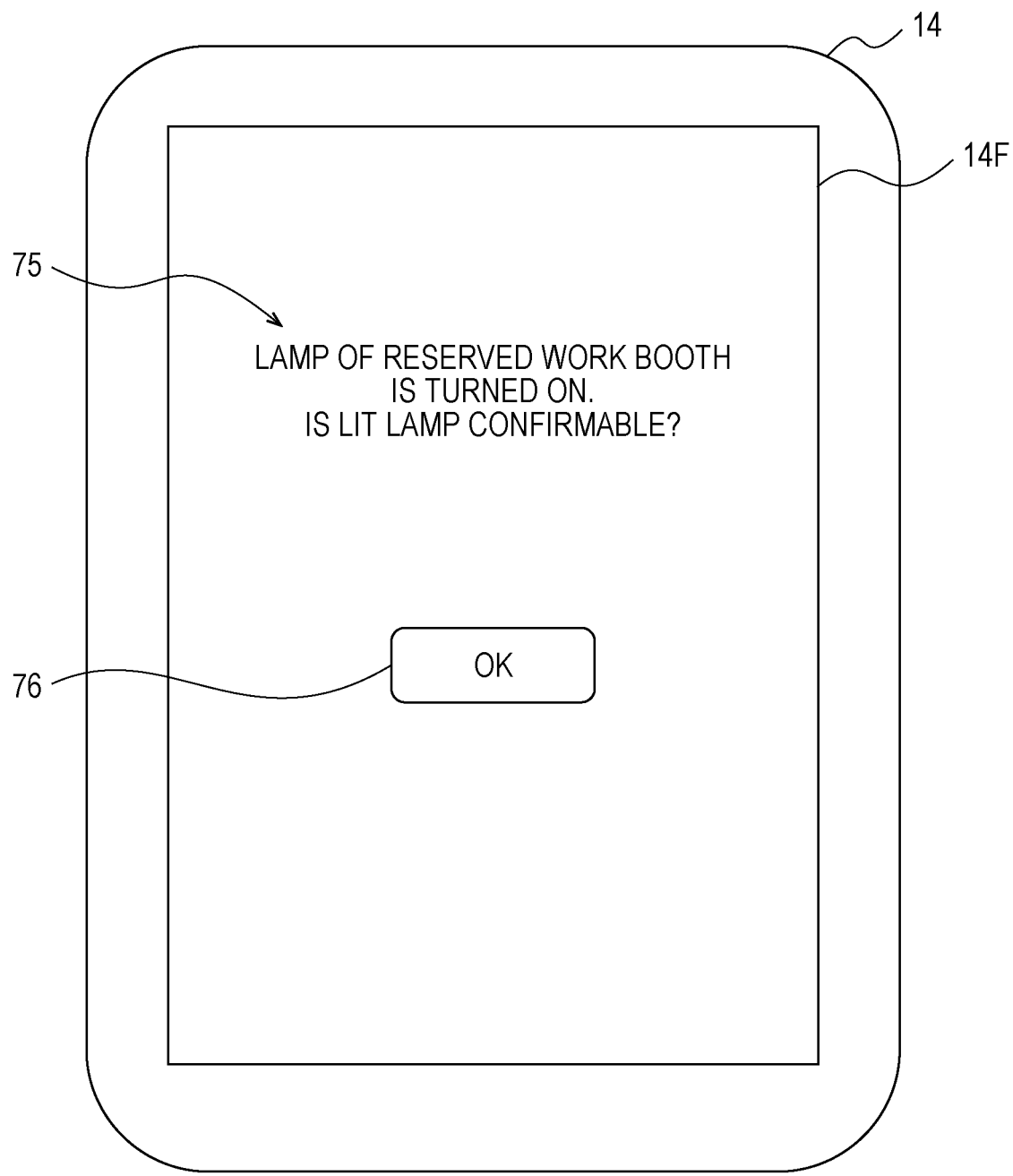
FIG. 27 illustrates a third display example showing the reservation information.

FIG. 27 illustrates a third display example showing the reservation information. The CPU 12A causes the display 14F to display the display example shown in FIG. 27 in a case where the location according to the acquired positional information of the portable terminal apparatus 14, that is, the current location, is within a predetermined distance (e.g., within 10 m) from the reserved private room 20. Before causing the display 14F to display the display example shown in FIG. 27, the CPU 12A causes the display 14F to display the display example shown in FIG. 25 or 26.

The display 14F shown in FIG. 27 displays the message information 75 and the OK button 76 as the reservation information.

For example, the message information 75 displayed in FIG. 27 reads "LAMP OF RESERVED WORK BOOTH IS TURNED ON. IS LIT LAMP CONFIRMABLE?".

In the fifth exemplary embodiment, when the user operates the OK button 76 while the display example shown in FIG. 27 is being displayed, the CPU 12A causes the display 14F to change to predetermined display contents.

Figure 28:
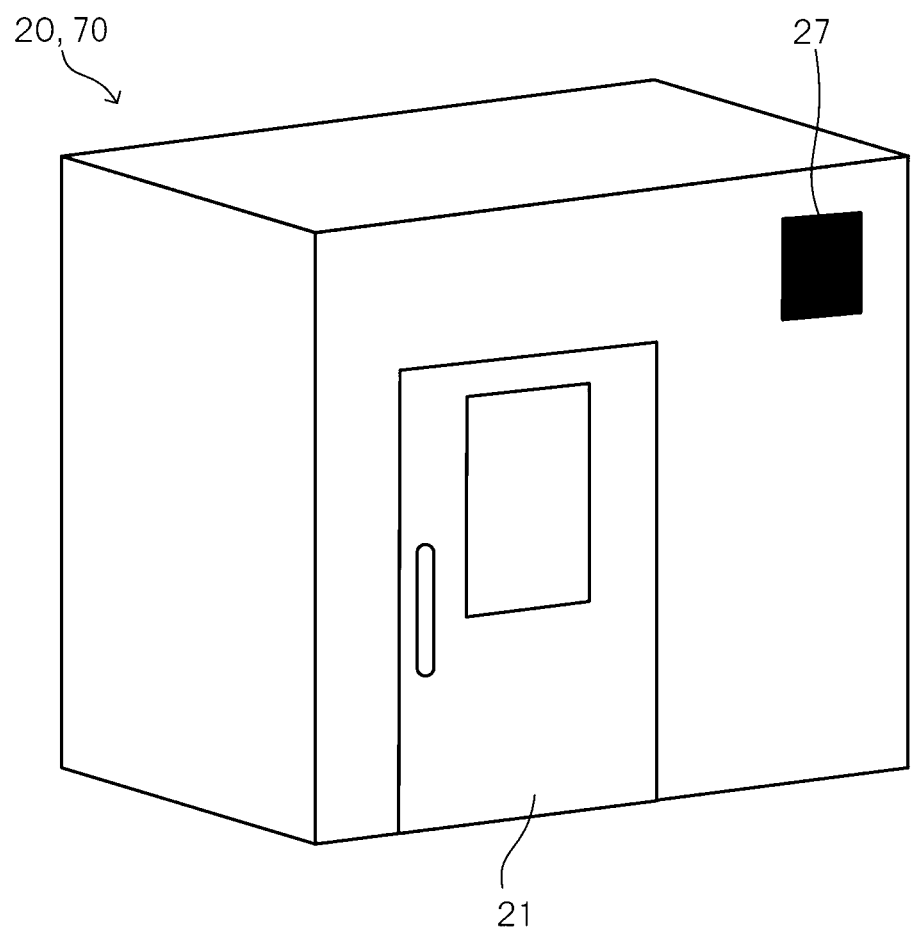
FIG. 28 illustrates a fourth display example showing the reservation information.

FIG. 28 illustrates a fourth display example showing the reservation information. When the CPU 12A causes the display 14F to display the display example shown in FIG. 27, the CPU 12A turns on the lamp 27 of the private room 20. Instead of or in addition to providing the notification about the reservation information to the private room 20 serving as a work booth 70 reserved by the user, the CPU 12A may provide the notification about the reservation information to work booths 70 (e.g., the private room 50 and the private room 60) that are not to be reserved by the user. In this case, the CPU 12A varies the contents of the reservation information to be provided between the reserved work booth 70 and the work booths 70 that are not to be reserved. Accordingly, the user may be informed of the difference between the reserved work booth 70 and the work booths 70 that are not to be reserved.

If the notification about the reservation information is to be provided by using the notifier equipped in the work booth 70, for example, the CPU 12A provides the notification about the reservation information by turning on the lamp 27 of the private room 20, as shown in FIG. 28. In FIG. 28, the lamp 27 is in a lit mode by being given a black color. Then, when the CPU 12A confirms an entry to the private room 20, the CPU 12A stops providing the notification about the reservation information using the notifier equipped in the work booth 70.

According to the above configuration, in the fifth exemplary embodiment, the user may be informed that no one has entered the reserved work booth 70 during the reserved period thereof by using the user terminal and the notifier equipped in the work booth 70. Moreover, in the fifth exemplary embodiment, the notification about the reservation information is provided by a method according to the positional information of the user terminal.

Furthermore, in the fifth exemplary embodiment, if the location according to the positional information of the user terminal is separated from the location of the reserved work booth 70 by a predetermined distance or more, the CPU 12A maintains the door of the work booth 70 in the locked state even when unlocking information is input. For example, in a case where the portable terminal apparatus 14 is the user terminal and the private room 20 is the work booth 70, if the current location of the portable terminal apparatus 14 is separated from the location of the private room 20 by a predetermined distance or more (e.g., 100 m or more), the CPU 12A maintains the door 21 of the private room 20 in the locked state even when unlocking information is input. Therefore, the fifth exemplary embodiment may achieve increased security of the work booth 70, as compared with a configuration that unlocks the door of the work booth 70 in response to input of unlocking information when the current location of the user terminal is separated from the location of the work booth 70 by a predetermined distance or more.

Furthermore, when the CPU 12A maintains the door of the reserved work booth 70 in the locked state even when unlocking information is input, the CPU 12A may notify the user terminal of the following message as the reservation information. For example, if the current location of the user terminal when the door of the work booth 70 is maintained in the locked state is separated from the location of the reserved work booth 70 by a predetermined distance or more (e.g., 100 m or more), the CPU 12A may notify the user terminal of the message "guidance information to the reserved work booth 70 shown in FIG. 26". Furthermore, if the current location of the user terminal when the door of the work booth 70 is maintained in the locked state is separated from the location of the reserved work booth 70 by a predetermined distance or more (e.g., 100 m or more) and is within a predetermined distance (e.g., 10 m) from the location of a work booth 70 different from the reserved work booth 70, the CPU 12A may notify the user terminal of the message "the user terminal is located in front of a work booth 70 different from the reserved work booth 70". If the current location of the user terminal when unlocking information is input is within a predetermined distance (e.g., 10 m) from the location of the reserved work booth 70, the CPU 12A may notify the user terminal of a message, as the reservation information, indicating that the user terminal is located near the reserved work booth 70.

In the fifth exemplary embodiment, the CPU 12A provides the notification about the reservation information to the portable terminal apparatus 14 of the user who is to use the work booth 70, as the user terminal carried by the user who has reserved the work booth 70. However, the user who has reserved the work booth 70 and the user terminal are not limited thereto. For example, the user who has reserved the work booth 70 may be a user (i.e., management user) who is not to use the work booth 70 and who is different from the user intending to use the work booth 70. Moreover, the user terminal may be the portable terminal apparatus 14 of the user who is to use the work booth 70 or of the management user, or may be, for example, a personal computer of the management user.

Specifically, the user terminal to be notified of the reservation information by the CPU 12A may be the terminal carried by the user who is to use the work booth 70, may be the terminal carried by the management user, or may include both the terminal carried by the user who is to use the work booth 70 and the terminal carried by the management user.

The information processing system 10 is capable of setting whether or not the current location of the user terminal carried by the user who is to use the work booth 70 is to be transmitted to the cloud server 12, and is configured to provide the notification about the reservation information to the user terminal carried by the management user only when the current location is set to be transmitted to the cloud server 12. If the CPU 12A is to provide the notification about the reservation information only to the user terminal carried by the management user, it is desirable that a notification about information, such as the reservation information, be provided from the management user to the user who is to use the work booth 70 without the intervention of the information processing system 10.

In the fifth exemplary embodiment, if the current location of the user terminal is separated from the location of the reserved work booth 70 by a predetermined distance or more (e.g., 100 m or more), the CPU 12A maintains the door of the work booth 70 in the locked state even when unlocking information is input. Alternatively, if the current location of the user terminal is separated by a specific distance or more (e.g., 5 km or more), which is greater than the predetermined distance, the CPU 12A may perform normal unlocking on the door of the work booth 70 in response to input of unlocking information. Specifically, if the current location of the user terminal is separated from the location of the reserved work booth 70 by the specific distance or more, the CPU 12A may determine that the unlocking information has been intentionally input from a distant location and perform normal unlocking on the door of the work booth 70.

Such input of unlocking information from a distant location may be performable from the user terminal of either the user who is to use the work booth 70 or the management user. For example, in a case where a linked account is set between the user terminal carried by the user who is to use the work booth 70 and the user terminal carried by the management user, the unlocking information may be inputtable from the user terminal carried by the management user. The linked account may be settable when the work booth 70 is to be reserved, or may be settable when the reservation is to be changed.

The following situation may be assumed as a case where only the user terminal carried by the management user is notified of the reservation information. It is assumed below that the "private room 50" is the reserved work booth 70, and the "private room 20" is a work booth 70 that is not a reservation target.

First, the user terminal carried by the user who is to use the private room 50 does not have an account in the dedicated website used for reserving work booths 70, whereas only the user terminal carried by the management user has the account. Therefore, in this case, the user terminal carried by the user who is to use the private room 50 does not receive any notification from the information processing system 10.

Then, unlocking information for the private room 50 is input from the user terminal carried by the management user located away from the location of the reserved private room 50 by a specific distance or more (e.g., 5 km or more).

In this case, it is assumed that the user who is to use the private room 50 is searching for the private room 50 instructed from the management user but has mistakenly arrived in front of the private room 20 that is not the reservation target. Moreover, it is assumed that there are multiple work booths 70 (e.g., the private room 20, the private room 50, and the private room 60) around the current location of the user who is to use the private room 50, and one of them, that is, the private room 50, has been reserved by the management user, whereas there are no reservations for the private room 20 and the private room 60 at the same time as the reservation by the management user.

Subsequently, the camera 26 provided in the private room 20, which is not the reservation target, where the user who is to use the private room 50 has arrived captures an image of the user, and the captured image is transmitted to the cloud server 12 via the controller 22 and the communication line 18.

The cloud server 12 acquiring the captured image determines that the user who is to use the private room 50 has mistakenly arrived at the wrong work booth 70 that is not the reservation target, and provides a notification about guidance information, as reservation information, for guiding the user to the reserved private room 50. The notification provided as the reservation information by the CPU 12A of the cloud server 12 to the user terminal carried by the management user includes the message "USER INTENDING TO USE PRIVATE ROOM 50 MAY BE LOST". Accordingly, the management user may contact the user who is to use the private room 50, so as to guide the user to the reserved private room 50.

In the above-described case, the CPU 12A is not limited to being configured to provide the notification about the reservation information only to the user terminal carried by the management user, and may be configured to provide the notification to the notifier 44 in the private room 20, which is not the reservation target, where the user who is to use the private room 50 has arrived.

In the fifth exemplary embodiment, the display example corresponding to the day of use of the reserved private room 20 is displayed as the message information 75 shown in FIG. 25. Alternatively, on a day other than the day of use of the reserved private room 20 (e.g., the day before the day of use), the message information 75 to be displayed as the reservation information may be as follows. For example, on the day before the day of use of the reserved private room 20, the message information 75 displayed by the CPU 12A may read "IS RESERVED DATE CORRECT?". In this case, the CPU 12A causes the display 14F of the portable terminal apparatus 14 to display this message information 75 when a time period in which the current location of the user terminal and the location of the work booth 70 are within a predetermined distance (e.g., within 10 m) continues for a certain duration.

In the fifth exemplary embodiment, since the notification about the reservation information is provided at the private room 20 by turning on the lamp 27, the CPU 12A causes the display 14F to display the message information 75 shown in FIG. 27 that reads "LAMP OF RESERVED WORK BOOTH IS TURNED ON. IS LIT LAMP CONFIRMABLE?". Alternatively, if the notification about the reservation information is to be provided at the private room 20 in the form of sound output from the loudspeaker 25, the message information 75 shown in FIG. 27 to be displayed on the display 14F by the CPU 12A may read "FOLLOWING MESSAGE WILL BE OUTPUT AS AUDIO GUIDANCE: 'THIS IS PRIVATE ROOM 20. PLEASE OPEN.' IS MESSAGE AUDIBLE?".

In the fifth exemplary embodiment, since the lamp 27 of the private room 20 is not to be turned on unless the notification about the reservation information is to be provided, the notification about the reservation information is provided by turning on the lamp 27. Alternatively, when the lamp 27 is to be turned on in a case other than the case where the notification about the reservation information is to be provided, the CPU 12A varies the lighting pattern of the lamp 27 between the case where the notification about the reservation information is to be provided and other cases. Accordingly, the user may recognize the difference between the lighting mode used for providing the notification about the reservation information and the lighting mode used for other cases.

In the fifth exemplary embodiment, the CPU 12A provides the notification about the reservation information by using both the user terminal and the notifier equipped in the work booth 70. Alternatively, the notification about the reservation information may be provided by using one of the user terminal and the notifier equipped in the work booth 70. Moreover, the notification about the reservation information may be provided in accordance with one of or a combination of the displaying method, the audio output method, and the lighting method by using at least one of the user terminal and the notifier equipped in the work booth 70.

Sixth Exemplary Embodiment

Next, a sixth exemplary embodiment will be described while omitting or simplifying sections redundant with other exemplary embodiments.

In the sixth exemplary embodiment, when the location according to the positional information of the user terminal is within a predetermined distance from the location of another work booth 70 different from the reserved work booth 70 and the different work booth 70 is available, the CPU 12A changes the reservation from the reserved work booth 70 to the different work booth 70. For example, the following description relates to a case where the portable terminal apparatus 14 is the user terminal, the private room 20 is the reserved work booth 70, and the private room 50 is the work booth 70 different from the reserved work booth 70. The different work booth 70 is an example of a different private room.

FIG. 29 illustrates a fifth display example showing the reservation information. The CPU 12A causes the display 14F to display the display example shown in FIG. 29 in a case where the acquired current location of the portable terminal apparatus 14 is within a predetermined distance (e.g., within 10 m) from the location of the private room 50 different from the reserved private room 20 and the private room 50 is available. In this case, the CPU 12A acquires, from the storage unit 12D, the reservation status of the private room 50 located within the predetermined distance from the current location of the portable terminal apparatus 14. Then, if the available time frame of the private room 50 that overlaps the reserved time frame (e.g., Nov. 30, 2020 11:00-12:00) of the private room 20 is a reservable time frame, the CPU 12A determines that the private room 50 is available.

The display 14F shown in FIG. 29 displays the message information 75, the OK button 76, and the cancel button 77 as the reservation information.

For example, the message information 75 displayed in FIG. 29 reads "BB STATION, Nov. 30, 2020, 11:00-12:00, CURRENT RESERVATION: PRIVATE ROOM 20, CHANGE RESERVATION TO: PRIVATE ROOM 50, WOULD YOU LIKE TO CHANGE RESERVATION?". In the sixth exemplary embodiment, when the user operates the OK button 76 while the display example shown in FIG. 29 is being displayed, the CPU 12A confirms that the reservation is to be changed, and changes the reservation from the private room 20 to the private room 50. In a case where the CPU 12A confirms that the reservation is to be changed and changes the reservation of the work booth 70, the CPU 12A stores the reservation status with respect to this reservation in the storage unit 12D. Accordingly, the reservation of the private room 20 made by the user is eliminated, whereas the reservation of the private room 50 is made in place of the reservation of the private room 20.

On the other hand, in the sixth exemplary embodiment, when the user operates the cancel button 77 while the display example shown in FIG. 29 is being displayed, the CPU 12A aborts the reservation changing process and changes the display 14F to predetermined display contents.

According to the above configuration, in the sixth exemplary embodiment, even when the reserved work booth 70 is not usable, another work booth 70 different from the relevant work booth 70 may be used.

Seventh Exemplary Embodiment

Next, a seventh exemplary embodiment will be described while omitting or simplifying sections redundant with other exemplary embodiments.

In the seventh exemplary embodiment, if the location according to the positional information of the user terminal is separated from the location of the reserved work booth 70 by a predetermined distance or more, the CPU 12A changes the reservation from the reserved work booth 70 to an available work booth 70 located at the shortest distance from the location of the user terminal. For example, the following description relates to a case where the portable terminal apparatus 14 is the user terminal, the private room 20 is the reserved work booth 70, and the private room 60 is the available work booth 70 located at the shortest distance from the location of the user terminal.

FIG. 30 illustrates a sixth display example showing the reservation information. The CPU 12A causes the display 14F to display the display example shown in FIG. 30 in a case where the acquired current location of the portable terminal apparatus 14 is separated from the location of the reserved private room 20 by a predetermined distance or more (e.g., 100 m or more).

In this case, the CPU 12A acquires, from the storage unit 12D, the reservation status of the work booth 70 located at the shortest distance from the current location of the portable terminal apparatus 14. Then, if the available time frame of the relevant work booth 70 that overlaps the reserved time frame (e.g., Nov. 30, 2020 11:00-12:00) of the private room 20 is a reservable time frame, the CPU 12A sets the relevant work booth 70 as the "available work booth 70 located at the shortest distance from the current location of the portable terminal apparatus 14".

In contrast, if the work booth 70 corresponding to the acquired reservation status is not available, the CPU 12A acquires, from the storage unit 12D, the reservation status of a work booth 70, excluding the relevant work booth 70, located at the shortest distance from the current location of the portable terminal apparatus 14, and determines whether or not the work booth 70 corresponds to the aforementioned "available work booth 70". This process is performed in a flow similar to that in the above description until the aforementioned "available work booth 70" is determined.

The display 14F shown in FIG. 30 displays the message information 75, the OK button 76, and the cancel button 77 as the reservation information.

For example, the message information 75 displayed in FIG. 30 reads "BB STATION, Nov. 30, 2020, 11:00-12:00, CURRENT RESERVATION: PRIVATE ROOM 20, CHANGE RESERVATION TO: PRIVATE ROOM 60, WOULD YOU LIKE TO CHANGE RESERVATION?". In the seventh exemplary embodiment, when the user operates the OK button 76 while the display example shown in FIG. 30 is being displayed, the CPU 12A confirms that the reservation is to be changed, and changes the reservation from the private room 20 to the private room 60. In a case where the CPU 12A confirms that the reservation is to be changed and changes the reservation of the work booth 70, the CPU 12A stores the reservation status with respect to this reservation in the storage unit 12D. Accordingly, the reservation of the private room 20 made by the user is eliminated, whereas the reservation of the private room 60 is made in place of the reservation of the private room 20.

On the other hand, in the seventh exemplary embodiment, when the user operates the cancel button 77 while the display example shown in FIG. 30 is being displayed, the CPU 12A aborts the reservation changing process and changes the display 14F to predetermined display contents.

According to the above configuration, in the seventh exemplary embodiment, even when the reserved work booth 70 is not usable, a work booth 70 that is different from the relevant work booth 70 and that is located at the shortest distance from the location of the user terminal may be used.

Other Exemplary Embodiments

As an alternative to the above exemplary embodiments in which the cloud server 12 is an example of the information processing apparatus, for example, an apparatus included in each work booth 70 may serve as an example of the information processing apparatus, and the process by the cloud server 12 may be performed by using the apparatus included in each work booth 70 (e.g., the controller 22 included in the private room 20).

As an alternative to the above exemplary embodiments in which each work booth 70 is a private space to be used by a single user, a single work booth 70 may be used by multiple users. Furthermore, a work booth 70 is not limited to a private space provided with equipment to be used for teleworking, and may be a room in a warehouse, building, or hotel, or may be a private space inside a vehicle. Moreover, a work booth 70 does not have to be a fully closed space so long as it is a private space closed with a locked door. For example, a work booth 70 may have a partially open configuration by omitting the ceiling or a side surface therefrom, may have a partially open configuration by having the door or a side surface of the work booth 70 not being in contact with the ceiling or the bottom of the work booth 70, or may have a partially open configuration by having the door or a side surface of the work booth 70 not being in contact with the ceiling or the floor of the installation location of the work booth 70.

Furthermore, in a case where a single work booth 70 is usable by multiple users, as mentioned above, the CPU 12A of the cloud server 12 may compare the number of users who have entered the work booth 70 with the number of users indicated in the reservation by using information from a human sensor and a camera included in the work booth 70, and may perform a process according to the comparison result.

For example, the CPU 12A may permit the use of the work booth 70 when the comparison result indicates that the numbers match. If the comparison result indicates that the numbers do not match, such as when the number of users who have entered the work booth 70 is larger than the number of users indicated in the reservation, the CPU 12A may demand an additional fee for the exceeding number of users, and may prohibit the use of the work booth 70 until payment of the additional fee is confirmed.

Furthermore, if a face photo of the user who is to use the work booth 70 is registered in advance, the CPU 12A may compare the registered face photo of the user with the face of the user who has entered the work booth 70, and may perform a process according to the comparison result. For example, if the comparison result indicates that the face photo and the face match, the CPU 12A may permit the use of the work booth 70. If the comparison result indicates that the face photo and the face do not match, the CPU 12A may determine that a user who has not reserved the work booth 70 has entered the work booth 70, and may provide a notification for urging an exit from the work booth 70.

Furthermore, if the purpose for using the work booth 70 is registered in advance, the CPU 12A may compare the user's registered usage purpose with a usage purpose derived from information obtained from a human sensor and a camera included in the work booth 70, and may perform a process according to the comparison result. For example, if the comparison result indicates that the usage purposes match, the CPU 12A may permit the use of the work booth 70. If the comparison result indicates that the usage purposes do not match, the CPU 12A may demand an additional fee, may output a warning to use the work booth 70 according to the usage purpose, or may provide a notification for urging an exit from the work booth 70.

The contents described in the above exemplary embodiments may be combined, where appropriate.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
provide a notification about reservation information related to a reservation of a reserved private room in a case where an entry to the private room is not confirmable before a predetermined time from a usage start time point according to the reservation of the private room; and
extend a predetermined usage end time point by a delay time if the entry to the private room at or after the usage start time point is confirmed, the delay time being determined based on an entry time point to the private room.

2. The information processing apparatus according to claim 1, wherein the processor is configured to:
provide the notification about the reservation information to at least one of a user terminal of a user who has reserved the private room and a notifier equipped in the private room.

3. The information processing apparatus according to claim 2, wherein the processor is configured to:
   switch between the notification about the reservation information to be provided to the user terminal and the notification about the reservation information to be provided to the notifier in accordance with acquired positional information of the user terminal.

4. The information processing apparatus according to claim 2, wherein the processor is configured to:
   extend a predetermined usage end time point by a delay time if the entry to the private room at or after the usage start time point is confirmed, the delay time being determined based on an entry time point to the private room.

5. The information processing apparatus according to claim 3, wherein the processor is configured to:
   extend a predetermined usage end time point by a delay time if the entry to the private room at or after the usage start time point is confirmed, the delay time being determined based on an entry time point to the private room.

6. The information processing apparatus according to claim 1, wherein the processor is configured to:
   receive designation of a freely-chosen time frame from a time frame in which the private room is reservable within a time frame in which the private room is available; and
   extend the predetermined usage end time point of the private room by the delay time if a time frame immediately after the received freely-chosen time frame is a reservable time frame of the private room.

7. The information processing apparatus according to claim 4, wherein the processor is configured to:
   receive designation of a freely-chosen time frame from a time frame in which the private room is reservable within a time frame in which the private room is available; and
   extend the predetermined usage end time point of the private room by the delay time if a time frame immediately after the received freely-chosen time frame is a reservable time frame of the private room.

8. The information processing apparatus according to claim 5, wherein the processor is configured to:
   receive designation of a freely-chosen time frame from a time frame in which the private room is reservable within a time frame in which the private room is available; and
   extend the predetermined usage end time point of the private room by the delay time if a time frame immediately after the received freely-chosen time frame is a reservable time frame of the private room.

9. The information processing apparatus according to claim 1, wherein the processor is configured to:
   provide a notification indicating that the predetermined usage end time point of the private room has been extended if the processor extends the predetermined usage end time point by the delay time.

10. The information processing apparatus according to claim 4, wherein the processor is configured to:
    provide a notification indicating that the predetermined usage end time point of the private room has been extended if the processor extends the predetermined usage end time point by the delay time.

11. The information processing apparatus according to claim 5, wherein the processor is configured to:
    provide a notification indicating that the predetermined usage end time point of the private room has been extended if the processor extends the predetermined usage end time point by the delay time.

12. The information processing apparatus according to claim 6, wherein the processor is configured to:
    provide a notification indicating that the predetermined usage end time point of the private room has been extended if the processor extends the predetermined usage end time point by the delay time.

13. The information processing apparatus according to claim 7, wherein the processor is configured to:
    provide a notification indicating that the predetermined usage end time point of the private room has been extended if the processor extends the predetermined usage end time point by the delay time.

14. The information processing apparatus according to claim 1, wherein the processor is configured to:
    provide a notification about information for guiding a user who has reserved the private room to the private room, the information serving as the reservation information.

15. The information processing apparatus according to claim 1, wherein the processor is configured to:
    maintain a door of the private room in a locked state even when unlocking information for unlocking the door of the private room is input if a location according to positional information of a user terminal of a user who has reserved the private room is separated from a location of the private room by a predetermined distance or more.

16. The information processing apparatus according to claim 1, wherein the processor is configured to:
    change the reservation of the private room to a different private room different from the private room if a location according to positional information of a user terminal of a user who has reserved the private room is within a predetermined distance from a location of the different private room and if the different private room is available.

17. The information processing apparatus according to claim 1, wherein the processor is configured to:
    change the reservation of the private room to another available private room located at a shortest distance from a location of a user terminal of a user who has reserved the private room if the location according to positional information of the user terminal is separated from a location of the private room by a predetermined distance or more.

18. The information processing apparatus according to claim 1, wherein the processor is configured to:
    provide the notification about the reservation information in a case where a detector provided in at least one of a door of the private room and an interior of the private room does not perform detection before a predetermined time from the usage start time point of the private room, the case being the case where the entry to the private room is not confirmable.

19. A non-transitory computer readable medium storing a program causing a computer to execute a process, the process comprising:
    providing a notification about reservation information related to a reservation of a reserved private room in a case where an entry to the private room is not confirmable before a predetermined time from a usage start time point according to the reservation of the private room; and
    extending a predetermined usage end time point by a delay time if the entry to the private room at or after the usage start time point is confirmed, the delay time being determined based on an entry time point to the private room.

\* \* \* \* \*